United States Patent
Ansari et al.

(10) Patent No.: US 10,708,946 B2
(45) Date of Patent: Jul. 7, 2020

(54) TECHNIQUE FOR DETERMINING A CHANNEL WIDTH OF A CHANNEL USED IN A WIRELESS COMMUNICATION NETWORK

(71) Applicant: Telefonaktiebolaget LM Ericsson (publ), Stockholm (SE)

(72) Inventors: Junaid Ansari, Aachen (DE); Eliane Semaan, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 15/509,150

(22) PCT Filed: Jan. 30, 2017

(86) PCT No.: PCT/EP2017/051937
§ 371 (c)(1),
(2) Date: Mar. 6, 2017

(87) PCT Pub. No.: WO2018/028838
PCT Pub. Date: Feb. 15, 2018

(65) Prior Publication Data
US 2018/0235005 A1 Aug. 16, 2018

Related U.S. Application Data

(60) Provisional application No. 62/374,137, filed on Aug. 12, 2016.

(51) Int. Cl.
*H04W 74/08* (2009.01)
*H04L 5/00* (2006.01)
*H04L 27/00* (2006.01)

(52) U.S. Cl.
CPC ......... *H04W 74/0808* (2013.01); *H04L 5/001* (2013.01); *H04L 5/006* (2013.01);
(Continued)

(58) Field of Classification Search
CPC ... H04L 5/0042; H04L 5/006; H04L 27/0006; H04L 5/001; H04L 5/0062; H04L 5/0073; H04W 74/0808
See application file for complete search history.

(56) References Cited

U.S. PATENT DOCUMENTS

| | | |
|---|---|---|
| 8,767,522 B2 | 7/2014 | Li et al. |
| 9,094,837 B2 | 7/2015 | Chandra et al. |

(Continued)

FOREIGN PATENT DOCUMENTS

WO 2017030491 A1 2/2017

OTHER PUBLICATIONS

Ericsson, "Discussion on Wi-Fi and DL-only LAA Coexistence for Multi-Channel Transmission", Aug. 24-28, 2015, 3Gpp, 3GPP TSG RAN WG1 #82 R1-154624, pp. 1-8 (Year: 2015).*

(Continued)

*Primary Examiner* — Un C Cho
*Assistant Examiner* — Shah M Rahman
(74) *Attorney, Agent, or Firm* — Murphy, Bilak & Homiller, PLLC

(57) ABSTRACT

The disclosure pertains to determining a channel width of a channel in a wireless communication network. An aspect is directed to a device (1200, 1300) configured to determine a quality indicator for each of a plurality of channels, determine, from the plurality of channels, a first subset of channels, the quality indicators of which meeting a first requirement, combine at least two adjacent channels of the first subset of channels to a combined channel, and perform a listen before talk, LBT, operation in the combined channel. Further aspects of the disclosure pertain to a further device for determining a channel width of a channel used in a (Continued)

wireless communication network, methods (1100, 1700), computer programs, and computer-readable recording media.

39 Claims, 14 Drawing Sheets

(52) U.S. Cl.
CPC ........ *H04L 5/0042* (2013.01); *H04L 27/0006* (2013.01); *H04L 5/0073* (2013.01)

(56) References Cited

U.S. PATENT DOCUMENTS

| | | | | |
|---|---|---|---|---|
| 10,257,855 | B2* | 4/2019 | Babaei | H04W 74/006 |
| 2006/0030267 | A1* | 2/2006 | Bhardwaj | H04B 1/1027 |
| | | | | 455/63.1 |
| 2012/0314808 | A1* | 12/2012 | Taoka | H04B 7/0452 |
| | | | | 375/299 |
| 2013/0163449 | A1* | 6/2013 | Flammer | H04W 74/0808 |
| | | | | 370/252 |
| 2013/0223245 | A1* | 8/2013 | Taoka | H04L 25/03343 |
| | | | | 370/252 |
| 2014/0254510 | A1* | 9/2014 | Porat | H04W 72/0493 |
| | | | | 370/329 |
| 2014/0369303 | A1* | 12/2014 | Gong | H04L 5/0062 |
| | | | | 370/329 |
| 2016/0007368 | A1* | 1/2016 | Moon | H04W 56/00 |
| | | | | 370/329 |
| 2016/0021661 | A1* | 1/2016 | Yerramalli | H04W 16/14 |
| | | | | 370/329 |
| 2016/0081010 | A1* | 3/2016 | Seok | H04W 74/0816 |
| | | | | 370/329 |
| 2016/0095110 | A1 | 3/2016 | Li et al. | |
| 2016/0105858 | A1* | 4/2016 | Damnjanovic | H04W 56/001 |
| | | | | 370/329 |
| 2016/0366689 | A1* | 12/2016 | Zhang | H04L 5/0091 |
| 2017/0019909 | A1* | 1/2017 | Si | H04L 47/27 |
| 2017/0034838 | A1* | 2/2017 | Trainin | H04W 74/0808 |
| 2017/0094543 | A1* | 3/2017 | Narasimha | H04L 43/16 |
| 2017/0094683 | A1* | 3/2017 | Sun | H04L 27/0006 |
| 2017/0215096 | A1* | 7/2017 | Moon | H04W 24/08 |
| 2018/0110057 | A1* | 4/2018 | Park | H04W 72/12 |
| 2018/0213562 | A1* | 7/2018 | Cierny | H04W 72/0453 |
| 2018/0220459 | A1* | 8/2018 | Park | H04W 74/00 |
| 2018/0255576 | A1* | 9/2018 | Bhorkar | H04L 5/00 |
| 2018/0279371 | A1* | 9/2018 | Li | H04L 5/001 |
| 2019/0053274 | A1* | 2/2019 | Kim | H04W 16/14 |

OTHER PUBLICATIONS

3GPP, "3GPP TS 36.211 version 8.9.0 Release 8", Jan. 2010, 3GPP, Version 8.9.0, pp. 79-80 (Year: 2010).*
IEEE Computer Society, "IEEE Std 802.11ac™—2013 Part 11: Wireless LAN Medium Access Control (MAC) and Physical Layer (PHY) Specifications Amendment 4", Dec. 11, 2013, LAN/MAN Standards Committee of IEEE, pp. 1-395, Total: 425 (Year: 2013).*
IEEE Computer Society, "IEEE Std 802.11™—2012 Part 11: Wireless LAN Medium Access Control (MAC) and Physical Layer (PHY) Specifications", Mar. 29, 2012, LAN/MAN Standards Committee of IEEE, pp. 1-2699, Total: 2798 (Year: 2012).*
3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.4.0, Sep. 2013, 1-120.
3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 1-347.
Ansari, Junaid et al., "A decentralized MAC protocol for opportunistic spectrum access in cognitive wireless networks", Computer Communications, Institute for Networked Systems, Aachen, Germany, Jun. 2013, 1399-1410.
Deek, Lara et al., "Intelligent Channel Bonding in 802.11n WLANs", IEEE Transactions on Mobile Computing, vol. 13, No. 6, Jun. 2014, 1242-1255.
Gast, Matthew S., "802.11av A Survival Guide", Wi-Fi at Gigabit and Beyond, Jul. 2013, 1-154.
Unknown, Author, "Broadband Radio Access Networks (BRAN); 5 GHz high performance RLAN; Harmonized EN covering the essential requirements of article 3.2 of the R&TTE Directive", ETSI EN 301 893 V1.7.1, Jun. 2012, 1-91.
Unknown, Author, "Broadband Radio Access Networks (BRAN); 5 GHz high performance RLAN; Harmonized EN covering the essential requirements of article 3.2 of the R&TTE Directive", ETSI EN 301 893 V1.8.1, Mar. 2015, 1-93.
Unknown, Author, "Further Discussion on LAA DL Multi-channel LBT", Broadcom Corporation, 3GPP TSG-RAN WG1 Meeting #83, R1-157009, Anaheim, USA, Nov. 15-22, 2015, 1-24.

* cited by examiner

Three frequency sub-bands with different channels - 1602

Selected channels across the three sub-bands shown striped - 1604

Weighting function computed for each channel - 1606

Channels identified as wide band and narrow band channels - 1608

Fig. 16

TECHNIQUE FOR DETERMINING A CHANNEL WIDTH OF A CHANNEL USED IN A WIRELESS COMMUNICATION NETWORK

TECHNICAL FIELD

The present disclosure generally relates to a technique for determining a channel width of a channel used in a wireless communication network. Methods and devices are provided for determining a channel width of a channel used in a wireless communication network. Further, and without limitation, the present disclosure describes how to identify and/or select channels to be used for data transmission in a wireless communication network.

BACKGROUND

In wireless communication networks, the frequency domain is divided into a plurality of channels, which are also referred to as carriers. Each of these carriers has a predefined bandwidth (or simply "width") in the frequency domain. The individual bandwidths of the carriers may be different, even in the same frequency spectrum. A typical carrier width used in the LTE standard is, e.g., 20 MHz. The carrier width may vary, e.g., based on the frequency region in which the respective carrier is located or based on the used communication standard.

Further, the technique of Carrier Aggregation, CA, makes it possible to use at least two of these carriers in uplink (UL) or in downlink (DL) for data transmission to or from the same wireless device. When CA is used, the individual aggregated carriers are also referred to as Component Carriers (CC).

However, currently the bandwidth of the individual carriers is treated to be fixed and there is no possibility to adjust the bandwidth dynamically in order to benefit, e.g., from the advantages of a larger bandwidth. Even when Carrier Aggregation Is applied, the width of the individual Component Carriers is still fixed. Therefore, the current technology is inflexible with regard to the possibility of adjusting a channel width dynamically.

Further, currently there is also no way to identify which carrier bandwidths should be treated/used as narrowband carriers and which carriers should be combined as larger width carrier—before even carrying out a transmission process (cf. listen before talk, LBT operation and subsequent data transmission in aggregated carriers).

SUMMARY

Accordingly, there is a need for a technique which solves the above problem or other related problems of prior art techniques. Specifically, there is a need for an improved efficient channel width and identification procedure.

According to a first aspect, a device for determining a channel width of a channel used in a wireless communication network is provided. The device is configured to determine a quality indicator for each of a plurality of channels, determine, from the plurality of channels, a first subset of channels, the quality indicators of which meeting a first requirement, combine at least two adjacent channels of the first subset of channels to a combined channel, and perform a listen before talk, LBT, operation in the combined channel.

According to a second aspect, a device for determining a channel width of a channel used in a wireless communication network is provided. The device comprises a network interface that is adapted to communicatively couple the device to the wireless communication network. The device further comprises a processor and a memory containing instructions executable by the processor to cause the device to determine a quality indicator for each of a plurality of channels, determine, from the plurality of channels, a first subset of channels, the quality indicators of which meeting a first requirement, combine at least two adjacent channels of the first subset of channels to a combined channel, and perform a listen before talk, LBT, operation in the combined channel.

According to a third aspect, a device for determining a channel width of a channel used in a wireless communication network is provided. The device comprises a first determining unit configured to determine a quality indicator for each of a plurality of channels, a second determining unit configured to determine, from the plurality of channels, a first subset of channels, the quality indicators of which meeting a first requirement, a combining unit configured to combine at least two adjacent channels of the first subset of channels to a combined channel, and a performing unit configured to perform a listen before talk, LBT, operation in the combined channel.

The following description may apply to all aspects described in this disclosure.

The channel width may be a bandwidth of a communication channel used in the wireless communication network. The wireless communication network may comprise a plurality of network nodes. The wireless communication network may operate under a wireless communication standard, e.g., a Third Generation Partnership Project (3GPP) standard, such as LTE or a standard succeeding LTE. Further, the technique described in the present disclosure may also be applied in future networks such as 5G (NR, "New Radio") or future Wi-Fi standards.

The present disclosure is not restricted to a specific "channel" or "carrier" definition. Frequency portions (i.e., bandwidths) adjacent to each other may be combined to result into a larger portion. The above can be applied in its most generic form.

The quality indicator may be indicative of a suitability of the respective channel for performing carrier bonding with the respective channel. In the present disclosure, the expression "carrier bonding" or "channel bonding" refers to combining at least two adjacent channels to a "combined channel", I.e., to a wider bandwidth channel or carrier. Thus, the expression "channel bonding" used in this disclosure shall not be confused with channel bonding in the Wi-Fi context, which is tied to specific channel frequencies with specific bandwidths.

In particular, the quality indicator may be indicative of a suitability of the respective channel for performing carrier bonding with the respective channel and a channel adjacent to the respective channel. In this disclosure, the expression "adjacent" may be understood such that in the frequency domain, there is no channel provided between two channels which are considered to be adjacent to each other. In other words, there is no need to introduce guard band in between the two adjacent (frequency) channels. For example, the quality indicator may comprise a value. In particular, the quality indicator may be represented by a single value larger than or equal to zero.

The first subset of channels may comprise all of those channels, the respective quality indicators of which meeting the first requirement. In the step of combining, for example two, but also three or four or a larger number of adjacent channels may be combined to the combined channel. In case more than two channels are combined to the combined channel, the combined channel forms a group of adjacent channels, such that between the channels of the group of adjacent channels, no channel is provided, which is not part of the group of adjacent channels.

For example, all channels which form a group of adjacent channels amongst each other may be combined to respective combined channels. Alternatively, only combined channels having a predefined maximum width (e.g., two channels, three channels, etc.) may be generated.

In the LBT operation, it may be checked whether an energy level in the respective channel is above or below a predefined threshold value. Depending on the results, the channel may be determined to be either clear or occupied. The LBT operation may comprise a plurality of individual Clear Channel Assessment (CCA) checks, wherein in each of the Clear Channel Assessment checks, it is checked whether the respective channel is clear or occupied. In view of the above, performing and LBT operation "In" a particular channel or performing a Clear Channel Assessment "In" a particular channel may mean, that the respective channel is observed over its entire bandwidth, whether it is clear or occupied. For example, in case an energy level above a predefined threshold value is detected at a particular frequency lying within the respective channel, the channel may be determined to be occupied. Other expressions for "occupied" are "busy" or "not available", Other expressions for "clear" are "Idle", "available", "free", or "not occupied". The predefined threshold may be selected depending on the channel bandwidth of the channel in which the LBT operation is performed. Additionally or alternatively, the predefined threshold may be dependent on the channel bandwidth of the channel in which the LBT operation is performed only in some predefined spectrum bands.

The device of any of the first to third aspect may further be configured to determine, from the plurality of channels which are not part of the first subset, a second subset of channels, the quality indicators of which meeting a second requirement, and perform a listen before talk, LBT, operation in at least one channel of the second subset.

The LBT operation in the combined channel and the LBT operation in the channel of the second subset may be performed simultaneously. For example, the channel(s) of the second subset may not be combined to combined channels. Hence, the channel(s) of the second subset may maintain their original width.

The device of any of the first to third aspect may further be configured to perform a listen before talk, LBT, operation in each of the combined channels and, if existent, in each channel of the first subset, which has not been combined to a combined channel, and in each of the channels of the second subset.

For example, in case all of the channels of the first subset can be combined with each other either to one or more combined channels, the LBT operation is performed in each of the combined channels and in each of the non-combined channels of the second subset.

The second requirement may define that a value of the respective quality indicator is above a second threshold value.

The first requirement may define that a value of the respective quality indicator is above a first threshold value.

The second threshold value may be lower than the first threshold value. Therefore, quality indicators not meeting the first requirement may meet the second requirement. In other words, the first requirement may be a stricter requirement than the second requirement.

The device of any of the first to third aspect may further be configured to determine, for each channel of the first subset, whether the channel has an adjacent channel, which is also part of the first subset, and thereby identify a plurality of groups of adjacent channels in the first subset, and combine the channels of each of the plurality of groups of adjacent channels to respective combined channels.

For the combined channels, a maximum number of channels that may be combined to one combined channel may be considered. Additionally or alternatively, a maximum width may be considered for combining two or more channels to a combined channel. However, in case no such limit is set, all channels of the first subset, which are respectively adjacent to each other, may be combined to one combined channel.

The device of any of the first to third aspect may further be configured to perform a listen before talk, LBT, operation in each of the combined channels and, if existent, in each channel of the first subset, which has not been combined to a combined channel.

In case it was possible to combine all channels of the first subset to one or more combined channels, no channels of the first subset exist, which have not been combined to a combined channel. In case such channels exist, these channels, which have not been combined to a combined channel, may be channels which maintain their original width.

The plurality of channels may comprise at least one channel in an unlicensed frequency spectrum.

In general, spectrum bands can be allocated or reserved, e.g., for governmental, military, commercial (e.g., cellular industry), usage. For example, the unlicensed frequency spectrum may be a frequency spectrum which has not been licensed (in other words, allocated or reserved) for any wireless communication. In particular, the unlicensed frequency spectrum may be a frequency spectrum, which has not been licensed for a particular wireless technology or application, e.g., cellular communication. For example, the unlicensed frequency spectrum may comprise a 5 GHz and/or a 60 GHz spectrum band.

The device of any of the first to third aspect may be configured to perform the listen before talk, LBT, operation such that it is checked whether the channel, in which the listen before talk, LBT, operation is performed, is clear or occupied.

The device of any of the first to third aspect may be configured to perform the listen before talk, LBT, operation such that the channel, in which the listen before talk, LBT, operation is performed, is determined to be clear in case an energy level in that channel is below a predefined threshold value and the channel, in which the listen before talk, LBT, operation is performed, is determined to be occupied in case the energy level in that channel is above the predefined threshold value.

The predefined threshold value may be preset by the network, i.e., by a network operator. The predefined threshold value may be configurable.

The device of any of the first to third aspect may be configured to set the predefined threshold value in dependence of the channel width of the channel, in which the listen before talk, LBT, operation is performed. The predefined threshold value may be determined based on a function including the channel width as a parameter.

Further, the predefined threshold value may be selected from a look-up table comprising a column for the channel width and a column for the predefined threshold value. Further, a value of the predefined threshold value may be transmitted from the network (e.g., a radio node) to the device. Alternatively, the function or look-up table, based on which the predefined threshold value is determined, may be transmitted from the network (e.g., a radio node) to the device.

The device of any of the first to third aspect may be configured to set the predefined threshold value in dependence of a frequency region, in which the channel, in which the listen before talk, LBT, operation is performed, is located.

The predefined threshold value may be determined based on a function including the frequency region as a parameter. Further, the predefined threshold value may be selected from a look-up table comprising a column for the frequency region and a column for the predefined threshold value. Further, a value of the predefined threshold value may be transmitted from the network (e.g., a radio node) to the device. Alternatively, the function or look-up table, based on which the predefined threshold value is determined, may be transmitted from the network (e.g., a radio node) to the device.

The device of any of the first to third aspect may be configured to determine the quality indicator based on at least one of the following parameters, link quality, cleanliness of the respective channel, historic behavior on the channel usage and on the channel bandwidth, presence of collocated wireless communication networks, required Quality of Service, QoS, in terms of signal to noise ratio, SNR, regulatory limits of an allowed maximum output power and/or maximum EIRP, Equivalent Isotropically Radiated Power, limits, regulatory limits of an allowed minimum and/or maximum channel bandwidth in a sub-band, in which the respective channel is located, device capability of the device, deployment scheme, and policy constraints.

Each of the aforementioned parameters may be expressed independently, e.g., as digital value (0 or 1) or as numerical value (e.g., values equal to or larger than zero). The parameter link quality may be measured in terms of channel quality indicator (CQI) or similar, reliability metric (packet error ratio, block error ratio), etc. The parameter cleanliness of the channel may correspond to an inverse of a detected radio frequency (RF) energy. The parameter historic behavior may capture a certain configurable number of the past attempts on the channel and the way channel bandwidth had been utilized. In order to give higher importance to more recent channel usage attempts, an exponential weighting can be used for the past attempts with highest weight assigned to the most recent history. The parameter indicating the presence of collocated wireless networks may be configured to rank the channel lower when it is also used or affected by an existing collocated network. The parameter indicating the required QoS in terms of SNR may further consider throughput and/or other metrics. This requirement may also be dependent on the type of the transmitted data. The parameter related to the regulatory limits may relate to the allowed maximum output power, to a maximum allowed EIRP, Equivalent Isotropically Radiated Power, or to the allowed minimum and maximum channel bandwidth in the specific sub-band.

The device of any of the first to third aspect may be configured to determine the quality indicator by determining a plurality of weighted parameters by multiplying each of the considered parameters with a predefined weight value, and determining the quality indicator to correspond to the sum of the weighted parameters.

The weight values each may have a value between 0 and 1, for example. The weight values may be normalized, such that a sum of all weight values may be equal to 1. The individual weight values may be configurable. For example, the individual weight values may be transmitted from the network (i.e., the network operator) to the device.

The device of any of the first to third aspect may further be configured to initiate a data transmission using carrier aggregation, wherein at least one of the channels, which have been determined to be clear in the listen before talk, LBT, operation, is used for carrier aggregation with another channel.

The data transmission may be an uplink data transmission (from a wireless device to a radio node) or a downlink transmission (from a radio node to a wireless device).

The another channel may be a channel in a licensed or unlicensed frequency spectrum. In case the "another channel" is in the licensed frequency spectrum, there is no requirement for LBT and this channel may simply be used without performing an LBT operation in it. In this case, carrier aggregation of this (licensed spectrum) channel and the channels (in the unlicensed spectrum), which have been determined using the aforementioned technique, is carried out for data transmission. Further, the another channel may be another one of the channels, which have been determined to be clear in the listen before talk (LBT) operation. In one example, all of the channels, which have been determined to be clear in the LBT operation, are used for carrier aggregation, i.e., are aggregated. In one example, all of the plurality of channels are in an unlicensed frequency spectrum and a standalone data transmission is initiated using carrier aggregation of all of the channels, which have been determined to be clear. In another example, all of the plurality of channels are in an unlicensed frequency spectrum and a Licensed Assisted Access (LAA) is performed, wherein carrier aggregation is carried out using a channel in a licensed frequency spectrum and at least one of the channels, which have been determined to be clear in the LBT operation.

The device of any of the first to third aspect may be a wireless device configured to communicate with the wireless communication network. The wireless device may be, e.g., a User Equipment (UE), a cell phone, a notebook, a tablet computer, a personal computer (PC), a machine type communication (MTC) device, Internet of Things (IoT) device, etc.

The device of any of the first to third aspect may be a radio node of the wireless communication network. The radio node may be, e.g., a base station, and eNodeB, an access node, an access point (AP), a coordinator node, or another node of the wireless communication network.

According to a fourth aspect, a device for determining a channel width of a channel used in a wireless communication network is provided. The device is configured to perform a listen before talk, LBT, operation in each channel of a first group of channels, wherein the listen before talk, LBT, operation comprises for each channel setting a counter associated with the respective channel to a random integer number, and performing a clear channel assessment, CCA, for the respective channel, wherein the counter is decreased by one in case the channel is determined to be clear and wherein the counter maintains its value in case the channel is determined to be occupied. The device is further configured to determine the channel, the counter of which first reaching a value of one, to be a primary channel, discard the counters of the channels of the first group of channels, which are not the primary channel, perform a clear channel assessment, CCA, for each channel of the first group of channels, by which it is determined whether the respective channel is clear or occupied and by which the clear channels are determined to belong to a second group of channels, and in case the primary channel is determined to be clear, combine at least two adjacent channels of the second group of channels to a combined channel, and initiate a data transmission over at least the combined channel.

According to a fifth aspect, a device for determining a channel width of a channel used in a wireless communication network is provided. The device comprises a network interface that is adapted to communicatively couple the device to the wireless communication network, a processor, and a memory. The memory contains instructions executable by the processor to cause the device to perform a listen before talk, LBT, operation in each channel of a first group of channels. The listen before talk, LBT, operation comprises for each channel setting a counter associated with the respective channel to a random integer number, and performing a clear channel assessment, CCA, for the respective channel, wherein the counter is decreased by one in case the channel is determined to be clear and wherein the counter maintains its value in case the channel is determined to be occupied. The memory further contains instructions executable by the processor to cause the device to determine the channel, the counter of which first reaching a value of one, to be a primary channel, discard the counters of the channels of the first group of channels, which are not the primary channel, perform a clear channel assessment, CCA, for each channel of the first group of channels, by which it is determined whether the respective channel is clear or occupied and by which the clear channels are determined to belong to a second group of channels, and in case the primary channel is determined to be clear, combine at least two adjacent channels of the second group of channels to a combined channel, and initiate a data transmission over at least the combined channel.

According to a sixth aspect, a device for determining a channel width of a channel used in a wireless communication network is provided. The device comprises a first performing unit configured to perform a listen before talk, LBT, operation in each channel of a first group of channels. The listen before talk, LBT, operation comprises for each channel setting a counter associated with the respective channel to a random integer number, and performing a clear channel assessment, CCA, for the respective channel, wherein the counter is decreased by one in case the channel is determined to be clear and wherein the counter maintains its value in case the channel is determined to be occupied. The device further comprises a determining unit configured to determine the channel, the counter of which first reaching a value of one, to be a primary channel, a discarding unit configured to discard the counters of the channels of the first group of channels, which are not the primary channel, a second performing unit configured to perform a clear channel assessment, CCA, for each channel of the first group of channels, by which it is determined whether the respective channel is clear or occupied and by which the clear channels are determined to belong to a second group of channels, a combining unit configured to, in case the primary channel is determined to be clear, combine at least two adjacent channels of the second group of channels to a combined channel, and an initiating unit configured to, in case the primary channel is determined to be clear, initiate a data transmission over at least the combined channel.

The device of any of the fourth to sixth aspect may correspond to any of the devices of the first to third aspect described above. The details described above with regard to the first to third aspect may also apply to the device of the fourth to sixth aspect.

The LBT operation may comprise, for each channel of the first group of channels, a plurality of CCAs, wherein these CCAs are performed with a predefined time interval between them. Further, each CCA may comprise sensing the respective channel (detecting and energy level in the respective channel) for a predefined sensing time. The CCAs may be performed until any of the counters of the channels of the first group of channels reaches a value of one. This channel is determined to be the primary channel. The counters described in this disclosure can also be referred to as downcounters.

The duration over which CCA operation is performed can be different for different spectrum bands. This interval can be regulated too for different spectrum bands and geographical regions.

The counters of the channels other than the primary channel may be discarded in a sense that the counters of these channels are not relevant anymore for determining how many CCAs are performed in the respective channels. The second of channels may consist of all those channels of the first group, which have been determined to be clear during the last CCA.

The CCA for each channel of the first group of channels may be carried out simultaneously on at least to channels of the first group, i.e., different channels are assessed at the same time (concurrently). The same holds for the other LBT and CCA operations described in this disclosure.

In case the primary channel is determined to be occupied, it may be decided that no data transmission is initiated. The step of initiating a data transmission may comprise performing Carrier Aggregation (CA) by aggregating the combined channel with at least another channel. The another channel may be, e.g., another channel of the second group of channels. For example, CA may be performed by aggregating all channels of the second group. Further, CA may be performed by aggregating the combined channel with at least one channel of a licensed frequency spectrum. In case the primary channel is not included in the combined channel, the data transmission may be carried out by aggregating the combined channel with at least the primary channel. In other words, in some embodiments, the data transmission may be always carried out at least in the primary channel, such that the primary channel is either part of the combined channel or the primary channel is used for carrier aggregation with the combined channel. The data transmission may be an uplink data transmission or a downlink data transmission.

The above process may be applied, e.g., in the licensed assisted case when there is at least one carrier in the licensed (dedicated) frequency spectrum. In the case of standalone operation the primary channel can be chosen, e.g., in a semi-static or static manner where the receiver(s) know about the channel. This is to solve the rendezvous problem, i.e., receivers should know which frequency channels they should listen to in order to detect/receive potential data packets.

The device of any of the fourth to sixth aspect may further be configured to, in case the primary channel is determined to be clear, determine, for each channel of the second group, whether the channel has an adjacent channel, which is also part of the second group, and thereby identify a plurality of groups of adjacent channels in the second group, combine the channels of each of the plurality of groups of adjacent channels to respective combined channels, and initiate a data transmission using carrier aggregation, wherein at least each of the combined channels and, if existent, each channel of the second group, which has not been combined to a combined channel, are used for carrier aggregation.

With regard to the combination of channels, the details defined above concerning the first to third aspects may also apply to the combining of channels of the fourth to sixth aspect.

The device of any of the fourth to sixth aspect may further be configured to, in case the primary channel is determined to be occupied, reiterate the steps of performing a listen before talk, LBT, operation, determining a primary channel, discarding the counters, and performing a clear channel assessment, CCA.

In case the primary channel is determined to be clear, the aforementioned reiterated steps may not be carried out and, instead, the steps of combining and initiating are carried out as described above. The reiterated steps may be reiterated a plurality of times, until a primary channel is found that is clear in the last CCA.

The plurality of channels may comprise at least one channel in an unlicensed frequency spectrum.

The device of any of the fourth to sixth aspect may be configured to perform the clear channel assessment, CCA, such that the channel, in which the clear channel assessment, CCA, is performed, is determined to be clear in case an energy level in that channel is below a predefined threshold value and the channel, in which the clear channel assessment, CCA, is performed, is determined to be occupied in case the energy level in that channel is above the predefined threshold value.

The device of any of the fourth to sixth aspect may be configured to set the predefined threshold value in dependence of the channel width of the channel, in which the clear channel assessment, CCA, is performed.

The device of any of the fourth to sixth aspect may be configured to set the predefined threshold value in dependence of a frequency region, in which the clear channel assessment, CCA, is performed, is located.

The device of any of the fourth to sixth aspect may be further configured to, before the step of performing a listen before talk, LBT, operation in each channel of the first group of channels, determine a quality indicator for each of a plurality of channels, determine, from the plurality of channels, a first subset of channels, the quality indicators of which meeting a first requirement, combine at least two adjacent channels of the first subset of channels to a combined channel, and determine that at least the combined channel belongs to the first group of channels.

In this case, the device may be configured to perform the method described with regard to the first to third aspect and the method described with regard to the fourth to sixth aspect. The first group of channels may consist of all the combined channels of the first subset of channels and, if existent, of all the remaining channels of the first subset of channels, which have not been combined. In addition to that, the first group of channels may comprise further channels, which are not part of the first subset and/or which have not been considered as the plurality of channels.

The device of any of the fourth to sixth aspect may be a wireless device configured to communicate with the wireless communication network.

The device of any of the fourth to sixth aspect may be a radio node of the wireless communication network.

According to a seventh aspect, a method for determining a channel width of a channel used in a wireless communication network is provided. The method comprises determining a quality indicator for each of a plurality of channels, determining, from the plurality of channels, a first subset of channels, the quality indicators of which meeting a first requirement, combining at least two adjacent channels of the first subset of channels to a combined channel, and performing a listen before talk, LET, operation in the combined channel.

The method of the seventh aspect may be performed by a device of any of the first to third aspect.

The details of the device of the first to third aspect may also apply to the method of the seventh aspect in a sense that the device is configured to perform the method of the seventh aspect. In other words, the method of the seventh aspect may comprise steps corresponding to the aforementioned device features of the first to third aspect.

According to an eighth aspect, a method for determining a channel width of a channel used in a wireless communication network is provided. The method comprises performing a listen before talk, LBT, operation in each channel of a first group of channels. The listen before talk, LBT, operation comprises for each channel setting a counter associated with the respective channel to a random integer number and performing a clear channel assessment, CCA, for the respective channel, wherein the counter is decreased by one in case the channel is determined to be clear and wherein the counter maintains its value in case the channel is determined to be occupied. The method further comprises determining the channel, the counter of which first reaching a value of one, to be a primary channel, discarding the counters of the channels of the first group of channels, which are not the primary channel, performing a clear channel assessment, CCA, for each channel of the first group of channels, by which it is determined whether the respective channel is clear or occupied and by which the clear channels are determined to belong to a second group of channels, and in case the primary channel is determined to be clear, combining at least two adjacent channels of the second group of channels to a combined channel and initiating a data transmission over at least the combined channel.

The method of the eighth aspect may be performed by a device of any of the fourth to sixth aspect.

The details of the device of the fourth to sixth aspect may also apply to the method of the eighth aspect in a sense that the device is configured to perform the method of the eighth aspect. In other words, the method of the eighth aspect may comprise steps corresponding to the aforementioned device features of the fourth to sixth aspect, and, if applicable, of the first to third aspect.

According to a ninth aspect, a computer program product is provided. The computer program product comprises program code portions to perform the steps of any of the methods described in this disclosure when the computer program product is executed on one or more processing devices.

The computer program product the ninth aspect may be stored on one or more computer-readable recording media, such as, e.g., optical recording media, magnetic recording media, solid state recording media, etc.

BRIEF DESCRIPTION OF THE DRAWINGS

Further details of embodiments of the technique are described with reference to the enclosed drawings, wherein:

FIG. 16 shows various steps of a channel width selection method according to the second embodiment for an exemplary non-limiting plurality of channels;

DETAILED DESCRIPTION

Figure 1:
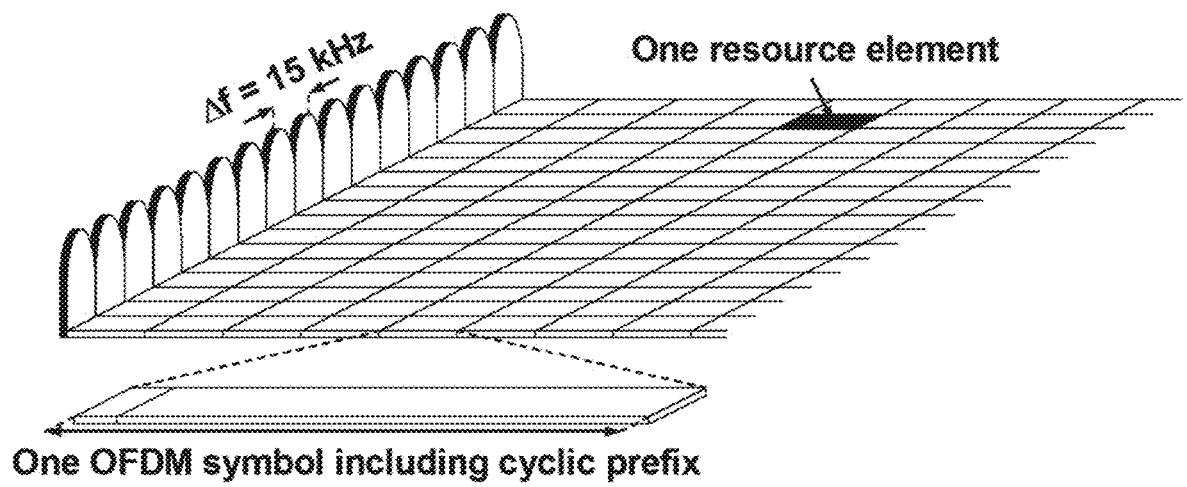
FIG. 1 shows a time-frequency representation of the LTE downlink physical resource.

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are n primarily described for 5G implementations such as Long Term Evolution (LTE) and New Radio (NR), it is readily apparent that the technique described herein may also be implemented in any other wireless communication network, including a Wireless Local Area Network (WLAN) according to the standard family IEEE 802.11 (e.g., IEEE 802.11a, g, n or ac; also referred to as Wi-Fi) and/or a Worldwide Interoperability for Microwave Access (WI-MAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the embodiments may also be embodied in a computer program product as well as in a system comprising a computer processor and memory coupled to the processor, wherein the memory is encoded with one or more programs that may perform the services, functions, steps and implement the units disclosed herein.

In the following description, firstly the situation in current LTE technology is described, wherein this LTE technology and architecture represents one possible basis for the embodiments described herein. Further, some problems are discussed that may arise in the context of this current LTE technology.

The technique according to the present disclosure may be applied in the context of carrier width selection, channel bonding, carrier aggregation, LBT operation, unlicensed spectrum access, and/or layers 1 and 2 of the OSI (Open Systems Interconnection) model.

The 3GPP initiative "License Assisted Access" (LAA) intends to allow LTE equipment to operate in the unlicensed radio spectrum. The candidate bands for LTE operation in the unlicensed spectrum include 5 GHz, 3.5 GHz, 1.9 GHz, 700 MHz, etc. In future, the 5G radio interface design or NR (New Radio) may use much wide range of wireless spectrum ranging from 100 MHz till 100 GHz in contrast to LTE-LAA. This would include the candidate unlicensed spectrum bands for LTE-LAA as well as 60 GHz as examples. The unlicensed spectrum can be used as a complement to the licensed spectrum or allow completely standalone operation.

In operation involving the licensed spectrum besides the unlicensed spectrum, devices connect in the licensed spectrum (primary cell or PCell) and use carrier aggregation to benefit from additional transmission capacity in the unlicensed spectrum (secondary cell or SCell). The licensed assisted mode of carrier aggregation (CA) framework allows aggregating two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum. While LTE mainly considers only 20 MHz wide carriers for aggregation, NR design depending upon the frequency spectrum would also include different carrier widths and maybe variable carrier width.

Regulatory requirements may not permit transmissions in the unlicensed spectrum without prior channel sensing, transmission power limitations, imposed radio duty cycle constraints or other measures to minimize the harmful interference to other coexisting devices using the same spectrum. Since the unlicensed spectrum must be shared with other radios of similar or dissimilar wireless technologies, a so called listen-before-talk (LBT) method is often applied.

Today, the highly attractive unlicensed 5 GHz and 60 GHz spectrum bands with large utilizable bandwidths are mainly used by equipment implementing the IEEE 802.11 Wireless Local Area Network (WLAN) standard. This standard is known under its marketing brand "Wi-Fi" and allows completely standalone operation in the unlicensed spectrum. Currently used technologies in the 5 GHz include Wi-Fi networks based on IEEE 802.11n/ac standards while 60 GHz spectrum includes Wi-Fi based on IEEE 802.11ad. Besides Wi-Fi, 60 GHz spectrum is also used by devices based on WirelessHD, IEEE 802.15.3c. In future 5 GHz spectrum is expected to be also used by LTE-LAA, IEEE 802.11ax and MulteFire while the 60 GHz spectrum would also be used by IEEE 802.11ay based networks. However, NR operation will not just be confined to the 5 GHz and 60 GHz unlicensed spectrum bands.

In the following, Long Term Evolution (LTE) will be briefly described. LTE uses orthogonal frequency-division multiplexing (OFDM) in the downlink and DFT-spread OFDM (also referred to as single-carrier FDMA, frequency-division multiple access) in the uplink. The basic LTE downlink physical resource can thus be seen as a time-frequency grid as illustrated in FIG. 1, where time is indicated on the horizontal axis and frequency on the "depth" axis. As shown in FIG. 1, each resource element corresponds to one OFDM subcarrier during one OFDM symbol interval. The uplink subframe has the same subcarrier spacing as the downlink and the same number of SC-FDMA symbols in the time domain as OFDM symbols in the downlink.

Figure 2:
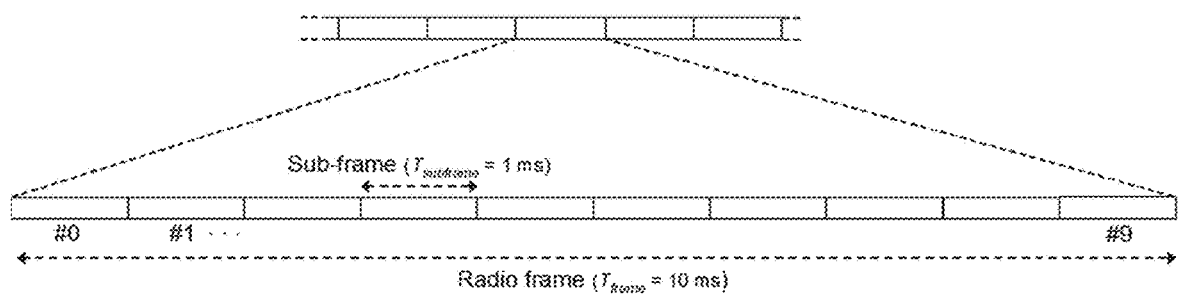
FIG. 2 shows the structure of LTE frames and subframes in the time domain.

FIG. 2 shows the LTE time-domain structure. In the time domain, LTE downlink transmissions are organized into radio frames of 10 ms, each radio frame consisting of ten equally-sized subframes of length $T_{subframe}$=1 ms as shown in FIG. 2. For normal cyclic prefix, one subframe consists of 14 OFDM symbols. The duration of each symbol is approximately 71.4 µs.

Furthermore, the resource allocation in LTE is typically described in terms of resource so blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the radio node (base station) transmits control information about which wireless devices (terminals) data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3, which shows a normal downlink subframe.

From LTE Rel-11 onwards, above described resource assignments can also be scheduled on the enhanced Physical Downlink Control Channel (EPDCCH). For Rel-8 to Rel-10 only Physical Downlink Control Channel (PDCCH) is available.

Figure 3:
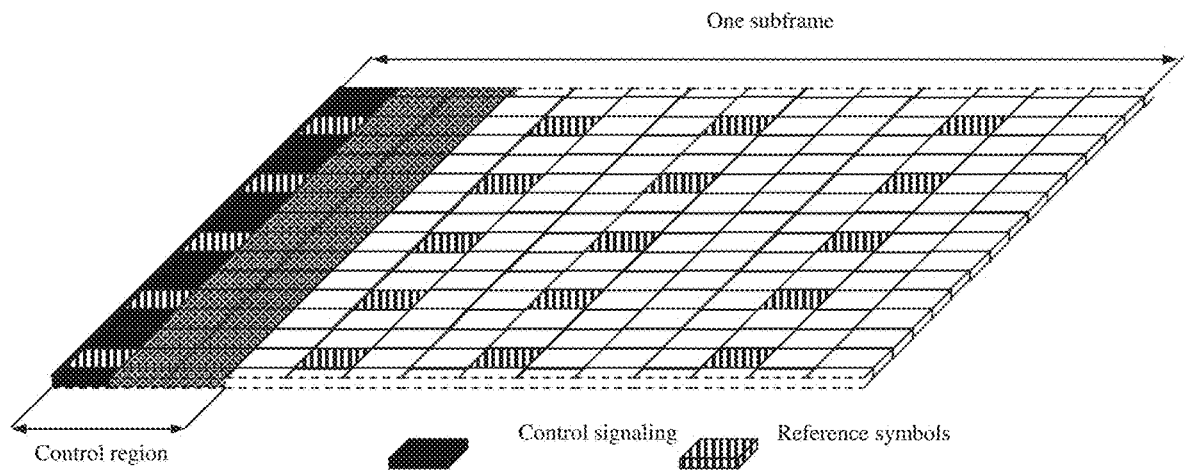
FIG. 3 shows a time-frequency representation of an LTE downlink subframe.

The reference symbols shown in FIG. 3 are the cell specific reference symbols (CRS) and are used to support multiple functions including fine time and frequency synchronization and channel estimation for certain transmission modes.

In the following, Physical Downlink Control Channel (PDCCH) and Enhanced PDCCH (EPDCCH) is described. The PDCCH/EPDCCH is used to carry downlink control information (DCI) such as scheduling decisions and power-control commands. More specifically, the DCI includes:

Downlink scheduling assignments, including PDSCH resource indication, transport format, hybrid-ARQ (hybrid Automated Repeat Request) information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH (Physical Uplink Shared Channel) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

Figure 4:
FIG. 4 shows carrier aggregation of five Component Carriers (CC)

In the following, carrier aggregation is described. The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e., that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 4. A CA-capable UE is assigned a primary cell (PCell) which is always activated, and one or more secondary cells (SCells) which may be activated or deactivated dynamically.

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

In the following, NR design is described. The NR design will likely standardize the OFDM based PHY design. However, instead of using a single OFDM numerology, NR design proposes to include a set (family) of numerologies. It is suggested to increase the subcarrier spacing of LTE by an integer factor and equally shorten the OFDM symbol and CP durations. However depending upon the deployment scenario, a channel-dependent CP is required for robustness against inter-symbol-interference (ISI) regardless of the subcarrier spacing. Also FFT sizes of up to 4 k are considered with utilization of ca. 3400 tones while keeping a margin for the guard subcarriers.

This would allow NR design to easily utilize higher carrier bandwidths (for instance, 100 MHz or more).

In the following, Wireless Local Area Network is described. In typical deployments of WLAN, carrier sense multiple access with collision avoidance (CSMA/CA) is used for medium access. This means that the channel is sensed to perform a clear channel assessment (CCA), and a transmission is initiated only if the channel is declared as idle (clear). In case the channel is declared as busy (occupied), the transmission is essentially deferred until the channel is deemed to be idle. When the range of several APs (access points) using the same frequency overlap, this means that all transmissions related to one AP might be deferred in case a transmission on the same frequency to or from another AP which is within range can be detected.

Figure 5:
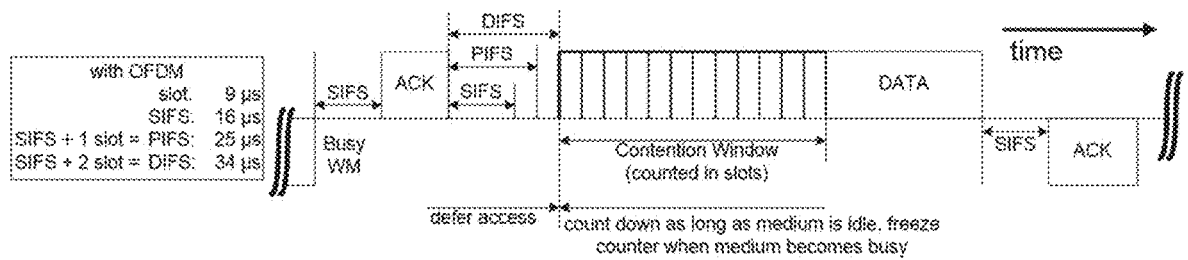
FIG. 5 shows an illustration of a listen before talk (LBT) scheme in Wi-Fi.

Effectively, this means that if several APs are within range, they will have to share the channel in time, and the throughput for the individual APs may be severely degraded compared to their isolated deployments. A general illustration of the listen before talk (LBT) mechanism is shown in FIG. 5. More precisely, FIG. 5 shows an illustration of the listen before talk (LBT) operation in Wi-Fi.

After a Wi-Fi station A transmits a data frame to a station B, station B shall transmit the ACK (acknowledgement) frame back to station A with a delay of 16 μs. Such an ACK frame is transmitted by station B without performing the LBT operation. To prevent another station interfering with such an ACK frame transmission, a station shall defer for a duration of 34 μs (referred to as DIPS, DCF Inter-frame Spacing, wherein DCF stands for Distributed Coordination Function) after the channel is observed to be occupied before a subsequent attempt to assess again whether or not the channel is occupied.

Therefore, a station that wishes to transmit first performs a CCA by sensing the medium for a fixed duration DIFS. If the medium is found to be idle, the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

The PIFS (PCF Inter-frame Spacing) is used to gain priority access to the medium, and is shorter than the DIFS duration. Among other cases, it can be used by STAs (Stations) operating under PCF, to transmit Beacon Frames with priority. At the nominal beginning of each Contention-Free Period (CFP), the PC shall sense the medium. When the medium is determined to be idle for one PIFS period (generally 25 μs), the PC shall transmit a Beacon frame containing the CF Parameter Set element and a delivery traffic indication message element.

In the following, truncated exponential backoff is described. In the above basic protocol, when the medium becomes available, multiple Wi-Fi stations may be ready to transmit, which can potentially result in collision. To reduce the possibility of collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, is set in the IEEE specs. It should be noted that collisions can still happen even with this random backoff scheme when there are many stations contending for the channel access at the same time. Hence, to reduce repeated collisions, the backoff contention window size CW is doubled whenever the station detects a collision of its transmission. The doubling of the contention window size continues after each collision till the CWmax limit is reached as specified in the IEEE 802.11 specs. When a station succeeds in its transmission without encountering collision, it resets its random backoff contention window size back to the default value CWmin.

In the following, load-based clear channel assessment in Europe regulation EN 301.893 is described. For a device not utilizing the Wi-Fi protocol, ETSI EN 301.893, V1.7.1 provides the following requirements and minimum behavior for the load-based clear channel assessment.

1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that needs to be observed before initiation of the transmission. The value of N shall be randomly selected in the range 1 . . . q every time an Extended CCA is required and the value stored in a counter. In other words, a counter associated with the respective channel is set to a random integer number N. The value of q is selected by the manufacturer in the range 4 . . . 32. This selected value shall be declared by the manufacturer (see clause 5.3.1 q) of ETSI EN 301.893, V1.7.1). The counter is decremented every time a CCA slot is considered to be "unoccupied". When the counter reaches zero, the equipment may transmit.

NOTE 2: The equipment is allowed to continue Short Control Signalling Transmissions on this channel providing it complies with the requirements in clause 4.9.2.3. of ETSI EN 301.893, V1.7.1.

NOTE 3: For equipment having simultaneous transmissions on multiple (adjacent or non-adjacent) operating channels, the equipment is allowed to continue transmissions on other Operating Channels providing the CCA check did not detect any signals on those channels.

3) The total time that an equipment makes use of an Operating Channel is the Maximum Channel Occupancy Time which shall be less than (13/32)×q ms, with q as defined in point 2 above, after which the device shall perform the Extended CCA described in point 2 above.

4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 4: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm EIRP transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm EIRP.).

Figure 6:
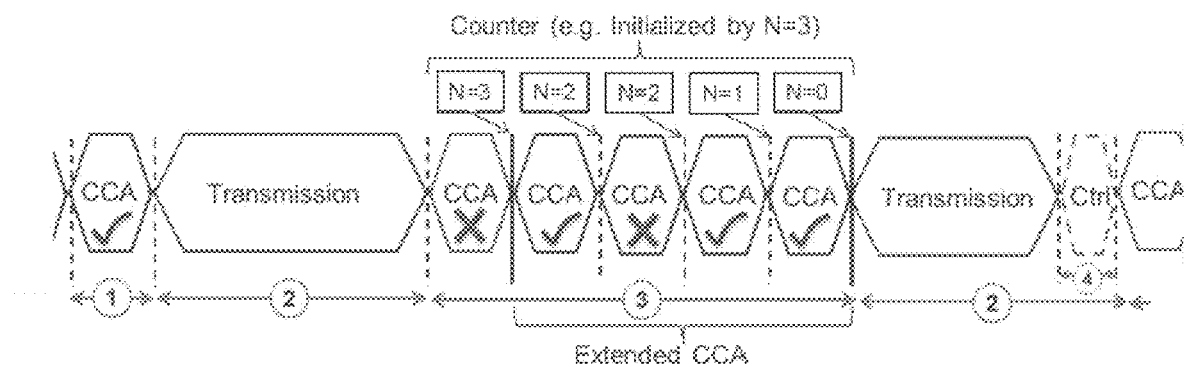
FIG. 6 shows an illustration of listen before talk (LBT) in ETSI EN 301.893.

An example to illustrate the EN 301.893 is provided in FIG. 6, which shows an illustration of listen before talk (LBT) in EN 301.893.

NOTE: Short Control Signalling Transmissions as per EN 301.893 V1.8.1 is defined as the transmissions used by adaptive equipment to send control signals (e.g. ACK/NACK signals, etc.) without sensing the operating channel for the presence of other signals.

NOTE: Adaptive equipment may or may not have Short Control Signalling Transmissions.

EN 301.893 Section 4.3.2.6.4.2 limits that if Implemented, Short Control Signalling Transmissions of adaptive equipment using wide band modulations other than FHSS shall have a maximum TxOn/(TxOn+TxOff) ratio of 10% within any observation period of 50 ms.

In the following, Energy Detection Threshold is described. ETSI EN 301 893 defines that the energy detection threshold for equipment conforming to IEEE 802.11ac-2013 for a 20 MHz channel should be TL=−62 dBm. As a second option, the Energy Detection Threshold for a 20 MHz wide carrier is proportional to the maximum transmit power (PH) according to the following formula, which assumes a 0 dBi receive antenna:

$$TL=\text{Min}(-62\text{ dBm},\text{Max}(-72\text{ dBm},-72\text{ dBm}+(23\text{ dBm}-PH)))$$

Equipment shall consider a channel to be occupied as long as the other transmissions are detected at level exceeding TL.

Figure 7:
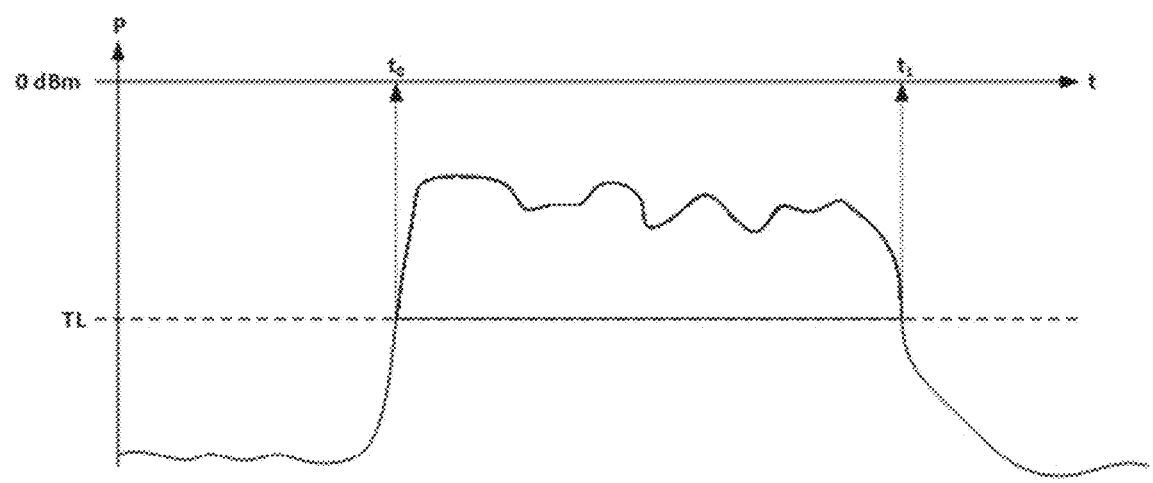
FIG. 7 shows an illustration of power level of a signal against time in the context of an energy detection threshold TL.

FIG. 7 shows an illustration of power level of the signal against time. After $t_0$ the equipment shall consider the channel to be occupied if the equipment observes of the channel for at least one observation slot. After $t_1$ the equipment may consider the channel to be unoccupied (clear) if the equipment observe the channel for at least one observation slot (Source: ETSI EN 301 893 draft).

As the bandwidth doubles, the energy detection threshold increases by 3 dB, as shown in the following table.

| Channel width | Signal threshold (primary) | Signal threshold (non-primary) | Energy threshold (non-primary) |
|---|---|---|---|
| 20 MHz | −82 dBm | −72 dBm | −62 dBm |
| 40 MHz | −79 | −72 | −59 |
| 80 MHz | −76 | −69 | −56 |
| 160 MHz | −73 | n/a | n/a |

IEEE 802.11n/ac uses −62 dBm of carrier sensing threshold for 20 MHz. With doubling of bandwidth, the threshold level increases by 3 dB. This means that for Wi-FR primary of 20 MHz it is −62 dBm and for a secondary channel of 20 MHz, the threshold is −59 dBm. The thresholds are not averaged across the primary and secondary channels. For the case of a 40 MHz secondary channel, the energy detection threshold is −56 dBm. The channel bonding operation or channel aggregation operation starts 25 μs before the instant when actual data transmission could take place.

Figure 8:
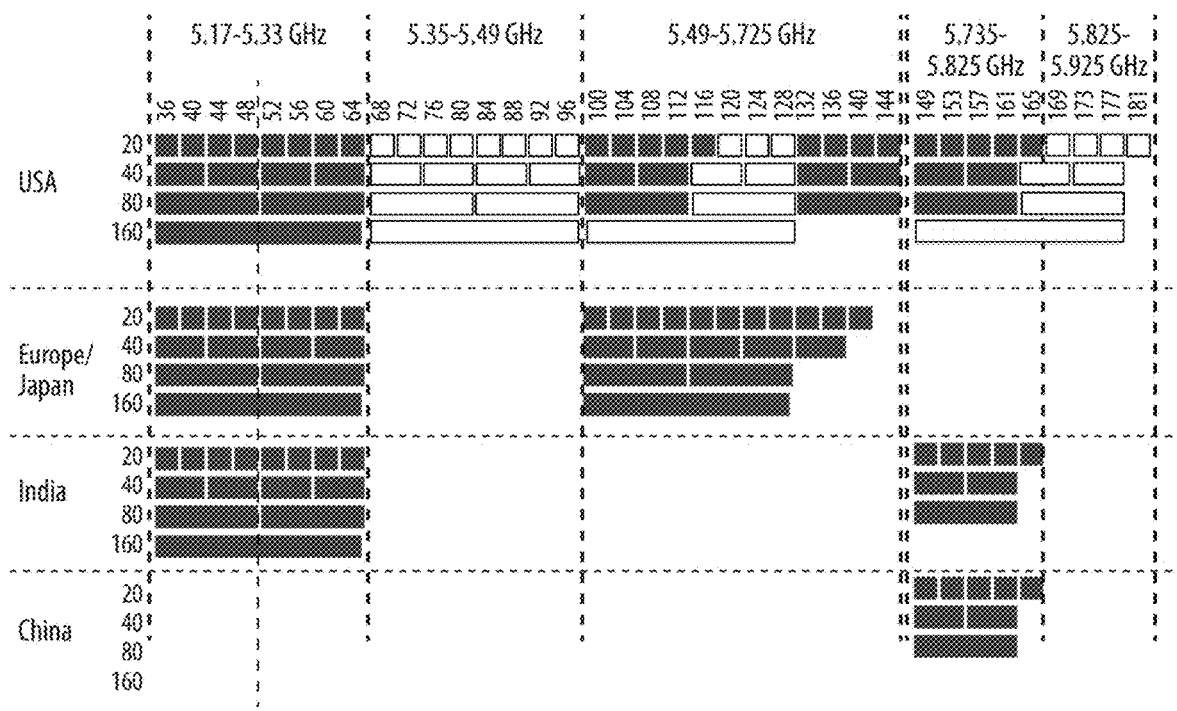
FIG. 8 shows an illustration of channel bonding for IEEE 802.11ac in different regions.

In the following, channel bonding or carrier aggregation is described. Wi-Fi (IEEE 802.11n/ac) allows adjacent channels to be bonded or aggregated. The primary channel and the bonded secondary channel are of the same width, and it is possible to bond channels to have bandwidth of 40 MHz, 80 MHz and 160 MHz in IEEE 802.11ac. IEEE 802.11n allows channel bonding of up to 80 MHz. FIG. 8 provides an overview of different channel bonding possibilities. More precisely, FIG. 8 shows an illustration of channel bonding for IEEE 802.11ac in different regions (source: O'Reilly Book by M. Gast, "802.11ac: A Survival Guide").

The use of wider bandwidth transmission has an advantage that the effective overhead for guard subcarriers is lowered leading to higher bandwidth utilization. As a comparison, 8%, 5% and 3% of the subcarriers guard overhead is inflicted with transmissions of 20 MHz, 40 MHz and 80/160 MHz, respectively.

In the following, licensed assisted access (LAA) to unlicensed spectrum using LTE is described. Up to now, the spectrum used by LTE is dedicated to LTE. This has the advantage that an LTE system does not need to care about coexistence with other non-3GPP radio access technologies in the same spectrum and thus spectrum efficiency can be maximized. However, the spectrum allocated to LTE is limited, which cannot meet the ever increasing demand for larger throughput from applications/services. Therefore, a new study item has been initiated in 3GPP on extending LTE to exploit unlicensed spectrum in addition to licensed spectrum.

Figure 9:
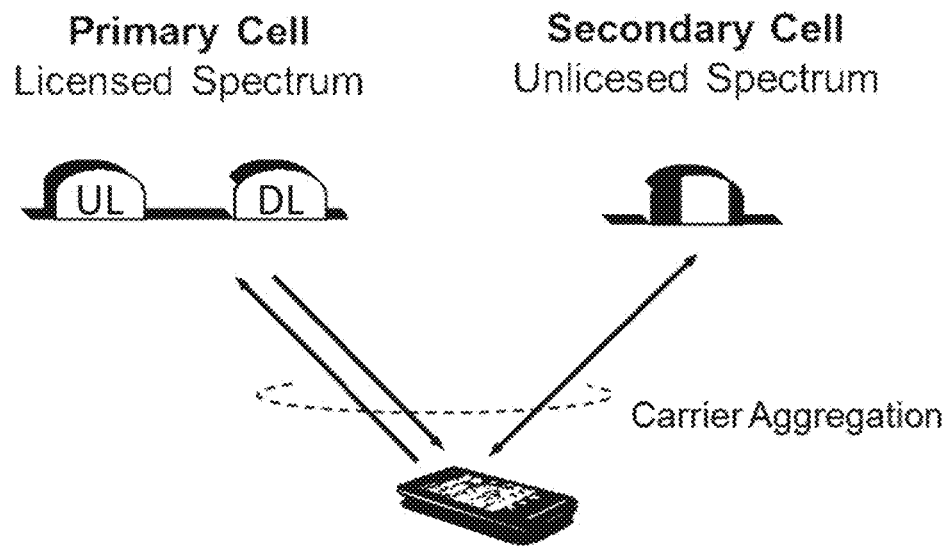
FIG. 9 shows a Carrier Aggregation (CA)-capable wireless device configured with one Licensed-Assisted Access (LAA) Secondary Cell (SCell)

Having Licensed-Assisted Access (LAA) in the unlicensed spectrum, as shown in FIG. 9, a UE is connected to a PCell in the licensed band and one or more SCells in the unlicensed band. In this application we denote a secondary cell in unlicensed spectrum as LAA secondary cell (LAA SCell). The LAA SCell may operate in DL-only (downlink-only) mode or operate with both UL (uplink) and DL traffic. Moreover, in future scenarios LTE nodes may operate in standalone mode in license-exempt channels without assistance from a licensed cell. Unlicensed spectrum can, by definition, be simultaneously used by multiple different technologies. Therefore, LAA as described above needs to consider coexistence with other systems such as IEEE 802.11 (Wi-Fi).

To coexist fairly with the Wi-Fi system, transmission on the SCell shall conform to LBT protocols in order to avoid collisions and causing severe interference to on-going transmissions. This includes both performing LBT before commencing transmissions, and limiting the maximum duration of a single transmission burst. The maximum transmission burst duration is specified by country and region-specific regulations, for e.g., 4 ms in Japan and 13 ms according to EN 301.893. For instance, in the context of LAA is shown in FIG. 8 with different examples for the duration of a transmission burst on the LAA SCell constrained by the maximum allowed transmission duration of 4 ms.

Figure 10:
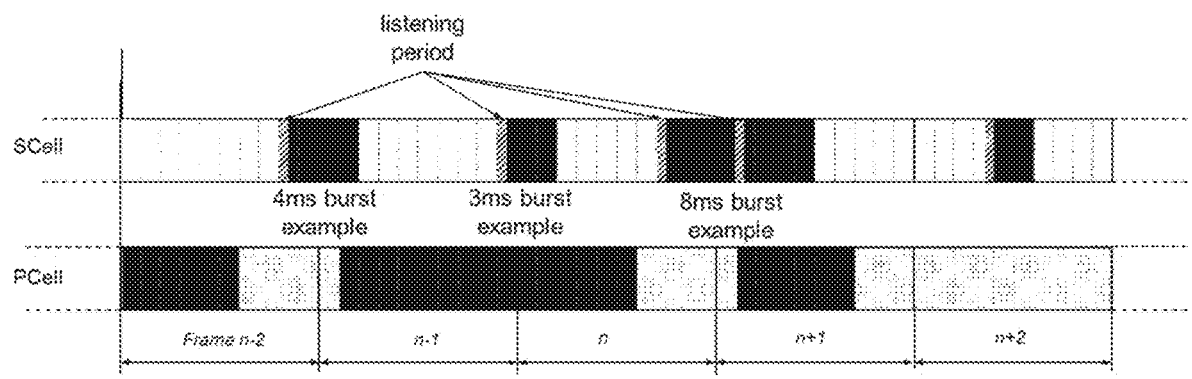
FIG. 10 shows Licensed-Assisted Access (LAA) to unlicensed spectrum using LTE Carrier Aggregation (CA) and listen before talk (LBT) to ensure symbiotic coexistence with other unlicensed band technologies.

FIG. 10 shows licensed-assisted access (LAA) to unlicensed spectrum using LTE carrier aggregation and listen-before-talk to ensure symbiotic coexistence with other unlicensed band technologies.

In the following, multi-carrier operation is descried. The use of LTE carrier aggregation (CA), introduced since 3GPP Rel-10, offers means to increase the peak data rate, system capacity and user experience by aggregating radio resources from multiple carriers that may reside in the same band or different band.

In Rel-13, LAA (Licensed-Assisted Access) has attracted a lot of interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac. Enabling the utilization of multi-carrier operation on unlicensed carrier using 3GPP technologies such as LAA and NR is deemed necessary as further CA enhancements. The extension of the CA framework beyond 5 carriers has been started in LTE Rel-13. The objective is to support up to 32 carriers in both UL and DL.

Today, the highly attractive unlicensed 5 GHz spectrum with up to 400 MHz of available bandwidth is mainly used by equipment implementing the IEEE 802.11 Wireless Local Area Network (WLAN) standard. In order to exploit a large bandwidth, Wi-Fi follows a systematic and hierarchal approach to combine multiple frequency channels. This scheme is known as channel bonding. In order to address the rendezvous problem and coordinate control information among nodes, Wi-Fi uses a fixed frequency channel known as the primary channel. Corresponding to the bandwidth of the primary channel, which can be 20 MHz, 40 MHz or 80 MHz, an equal bandwidth secondary channel can be bonded. The secondary channel is always adjacent to the primary channel in Wi-Fi. Transmission on secondary channels is not allowed if the primary channel is not idle. Unlike Wi-Fi, Rel-13 LTE allows aggregating non-contiguous carriers. While aggregating non-contiguous carriers for NR and LTE-LAA is seen as an advantage and provides flexibility, using wider carrier bandwidths and/or adjacent carriers has the advantage of using less guard subcarriers—leading to effectively better spectral efficiency.

ETSI EN 301 893 text states that for Wi-Fi, the carrier sensing threshold is −62 dBm while for other technologies (for instance, LAA, NR, MulteFire, etc.) the threshold is −72 dBm. This implies that the threshold for non-Wi-Fi technologies is −72 dBm regardless of the bandwidth (20 MHz, 40 MHz, 80 MHz and so on). This means that using larger bandwidth effectively makes the CCA mechanism less sensitive.

In the following, problems with existing solutions are described.

Current LTE-LAA design considers a fixed 20 MHz of carrier bandwidth for the aggregation operation. While multiple such carriers can be aggregated in LTE, it does not exploit the advantage of wider carrier widths. Larger carrier bandwidth would allow a higher data subcarriers to total subcarriers ratio—thereby increasing the spectrum utilization efficiency.

The design of LTE-LAA does not allow using non-homogenous carrier widths in the unlicensed spectrum.

With current LTE-LAA design of the LBT operation in 20 MHz wide carriers, the buffer management and framing operations have to be performed at individual independent 20 MHz wide carriers.

The design of LTE-LAA or Wi-Fi is mainly focused on the 5 GHz spectrum, while higher unlicensed frequencies (e.g., 60 GHz) could support much larger channel widths. This is not addressed.

Research results (see, e.g., L. Deek, E. Garcia-Villegas, E. Belding, S. J. Lee, and K. Almeroth, "Intelligent Channel Bonding in 802.11n WLANs", in IEEE Transactions on as Mobile Computing, vol. 13, no. 6, pp. 1242-1255, June 2014, in the following: "Deek et al.") have shown that using larger channel bandwidths does not always provide higher QoS, and instead the carrier widths should be selected appropriately. This provision is absent in any of the existing standards. Deek et al. reported their observations from Wi-Fi IEEE 802.11n standard but no solution was provided. The present disclosure provides a (generic) solution and further enhances the possibilities such as use of mixed bandwidths, licensed assisted operation, etc.

In order to solve one or more of the above problems or related problems, the present disclosure describes a method, which allows radio equipment (e.g., New Radio (NR) equipment) to dynamically select the carrier bandwidth depending upon the data traffic requirements, link characteristics and spectral conditions. While NR design can provide the flexibility to aggregate non-adjacent carriers independently, using only fixed narrow bandwidth carriers has the disadvantage that it leads to significant overhead in terms of (i) multiple LBT operations (multiple independent LBT operations in individual carriers are required to cover the same effective bandwidth) (ii) guard subcarriers (guard subcarriers are used in OFDM system to avoid out of band emissions), and (iii) higher buffer management overhead. On the other extreme, using only wide carriers lessens the possibility to exploit narrower utilizable portion of the spectrum, and increases the chances of losing the carrier for potential transmission, i.e., unsuccessful LBT.

The methods described in this disclosure opportunistically and dynamically select the carrier widths. Thus, it combines the advantages of using narrow carriers as well as using wider carriers depending upon the traffic load conditions, channel/link behavior and spectral characteristics. While using carriers of wider bandwidth does not always warrant high throughput and reliability (cf. research study by Deek et al.), the present disclosure describes a method when to use narrow carrier bandwidth and when to use wider carrier bandwidth. Moreover, the present disclosure allows the selection of mixed carrier bandwidths (narrow plus wide, i.e., non-uniform bandwidths) when appropriate. Further, the present disclosure describes the use of a license assisted operation and allows the selection of channels/channel bandwidths for this license assisted operation.

Embodiments of this disclosure describe both licensed assisted mode of operation as well as standalone operation in the unlicensed spectrum. In license assisted systems, e.g., LAA, LTE-U and NR, the "primary" channel can always be in the license spectrum and this would allow more agility for carrier(s) selection in the unlicensed spectrum and therefore secondary carrier(s) in the unlicensed spectrum can be aggregated on a dynamic basis. The rendezvous problem, i.e., agreement on frequency channels used by the transmitter and receiver(s), is resolved through the "primary" carrier in the licensed spectrum.

The technique described in the present disclosure has one or more of the following advantages.

The technique according to the present disclosure allows future radio networks such as NR to dynamically aggregate carriers with narrow and wide carrier bandwidths depending upon the traffic conditions, the link/channel behavior and the spectral characteristics.

Being able to opportunistically select narrow carrier bandwidths allows NR to be more flexible and agile in utilizing smaller portions of the wireless spectrum that are free.

Being able to dynamically select wide carrier bandwidths allows NR to lower the effective guard band overhead and instead use some of the guard subcarriers for data transmission—thereby increasing the spectrum utilization efficiency and achieving higher throughput.

Another advantage of being able to select large bandwidth channels before performing the LBT operation is that effectively lesser number of LBT operations are required to cover effectively the same bandwidth as would have been the case with smaller bandwidth channels.

While using carriers of wider bandwidth does not always warrant high throughput and reliability (cf. research study by Deek et al.), this disclosure describes a method when to use narrow carrier bandwidth and when to use wider carrier bandwidth. Moreover, this disclosure allows the selection of mixed carrier bandwidths (narrow plus wide, i.e., non-uniform bandwidths) when appropriate.

The method described allows NR to adapt its behavior according to the subject traffic conditions, link/channel characteristics and the spectral environment, where the system is deployed.

Although the above advantages are described with regard to New Radio (NR) it should be appreciated that the technology of the present disclosure can be applied in any suitable communication network.

It should be noted that although terminology from 3GPP NR has been used in this disclosure to exemplify the embodiments, this should not be seen as limiting the scope of the embodiments to only the aforementioned system or to only the specific embodiments described below. Other wireless systems may also benefit from exploiting the ideas covered within this disclosure.

Also it should be noted that terminologies such as base station/eNodeB/radio node and UE/wireless device should be considered non-limiting and it does in particular not imply a certain hierarchical relation between the two; in general "eNodeB" or "radio node" could be considered as device 1 and "UE" or "wireless device" could be considered as device 2 and these two devices communicate with each other over some radio channel. Further, the methods described herein can be performed by a radio node of a wireless communication network and/or by a wireless device configured to communicate with a wireless communication network. Any of the methods described herein may also be performed by a cloud computing device. For example, one or more of the steps of the described methods may be performed by another device and/or another processor than the remaining method steps.

In this section, the embodiments will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

It should be noted that the terms channel and carrier are used interchangeably in this disclosure and they have the same meaning. It is referred to a certain defined frequency bandwidth, which can be different across different frequency bands.

It should be noted that the 5 GHz spectrum and the behavior of Wi-Fi as a coexisting system has been mentioned at a few places only to exemplify the details of the method and must not be seen as a limitation of the method and its embodiments.

The method is equally applicable to other unlicensed frequencies and license shared frequencies (e.g., 2.4 GHz, 3.5 GHz, 60 GHz, etc.), where the carrier aggregation concepts can be applied. Furthermore, 20 MHz as a narrow carrier width and integer multiples of this narrow carrier bandwidth should be seen just as examples as used by LAA and Wi-Fi in the 5 GHz unlicensed spectrum. The method and its embodiments are equally applicable to other frequency bands with different channel bandwidths.

It should be noted that the requirements for LBT operation can be unique for each frequency spectrum and regional regulations. The minimum energy detection thresholds are specified in regulatory documents based on the frequency spectrum and the bandwidth usage. This disclosure is not constrained by any specific LBT parameters depending upon a certain region and instead the LBT parameters can be adjusted to fulfill the minimum requirements and can further be selected to achieve more sensitivity with regards to any product/design specific implementation. Furthermore, the carrier sensing thresholds and the back-off window parameters for the LBT algorithms can be reconfigured at runtime. Even though certain regions and certain spectrum bands do not mandate to use LBT, it could be beneficial to use LBT for spectrum sharing, coexistence, and to avoid causing and being interfered from unwanted spectral noise/transmissions.

Wider contiguous bandwidth has the advantage that effectively less guard subcarriers are needed in the OFDM based systems. These guard subcarriers are required to avoid the OOB (Out of Band) emissions. Some of the not needed guard carriers can instead be used to carry data, which leads to higher throughput and better spectrum utilization. Combining carriers to achieve wider bandwidth is not always possible because contiguous (adjacent) channels can be found occupied/busy, and instead smaller available portions of the spectrum can be utilized. Thus, it can be important to not only use either narrow or wide carriers but instead select the bandwidth of the carriers dynamically. This includes the selection of narrow carriers, wide carriers or mix of the above. It should be noted that selecting narrow or wide bandwidth carriers in an arbitrary fashion does not provide high throughput as confirmed by extensive measurements in the paper by Deek et al. for IEEE 802.11n based Wi-Fi network. In this disclosure, methods and embodiments are described on how to select carrier widths in an intelligent manner which warrants high throughput and reliability.

Any of the embodiments described below may be carried out in the context of one or more of the technologies described above. In particular, the embodiments described below may be implemented in an LTE system and/or an LTE communication network. As an example, the principles of the LBT procedure described with regard to FIG. 6 may also apply to an LBT procedure described in the below embodiments, where applicable.

Figure 11:
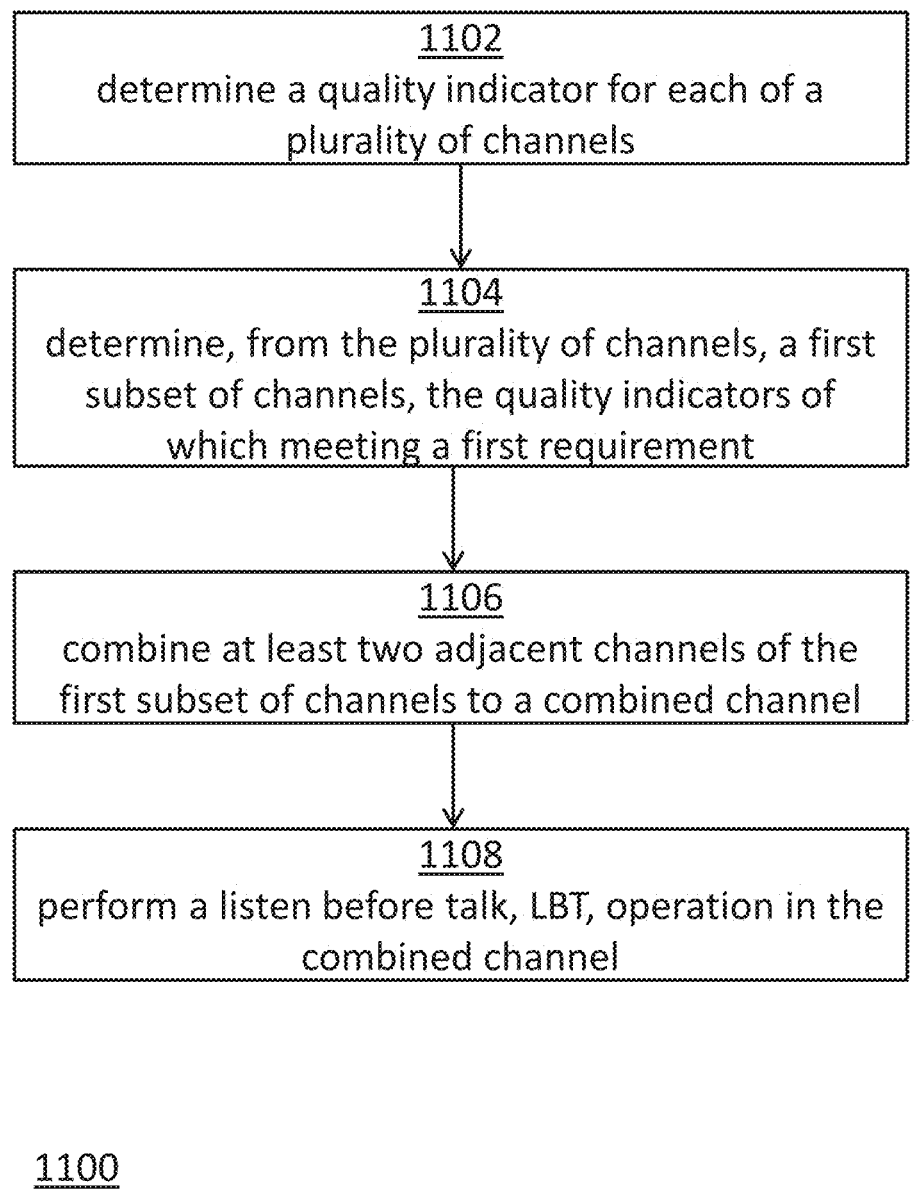
FIG. 11 shows a flowchart of a first embodiment of a method for determining a channel width of a channel used in a wireless communication network, according to the present disclosure.

FIG. 11 shows a flowchart of a method for determining a channel width of a channel used in a wireless communication network, according to a first embodiment of the present disclosure. The method may be carried out by any of the devices described in the present disclosure. In particular, the method may be carried out by any of the devices shown in FIG. 12, FIG. 13, and FIG. 18. The device carrying out the method may be, e.g., a wireless device or a radio node. Further, the method may be carried out by a cloud computing device and/or by a plurality of devices that may be geographically distributed and that may comprise a plurality of processors and/or a plurality of memories.

The method comprises a first step 1102 of determining a quality indicator for each of a plurality of channels, a second step 1104 of determining, from the plurality of channels, a first subset of channels, the quality indicators of which meeting a first requirement, a third step 1106 of combining at least two adjacent channels of the first subset of channels to a combined channel, and a fourth step 1108 of performing a listen before talk, LBT, operation in the combined channel. More exemplary specific details regarding the method of the first embodiment will be explained with regard to the method of the second embodiment described below.

Figure 12:
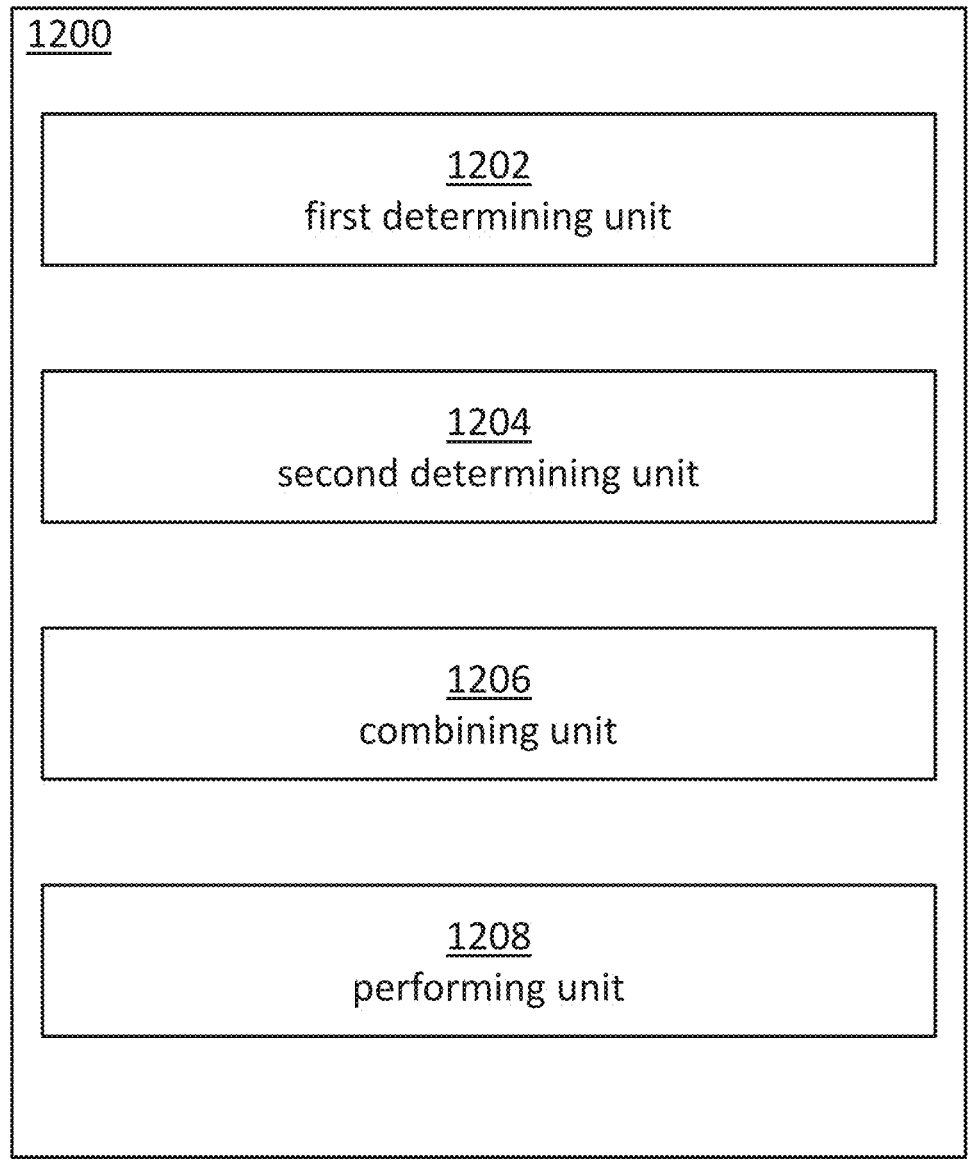
FIG. 12 shows a first schematic representation of a device for determining a channel width of a channel used in a wireless communication network, according to the present disclosure.

FIG. 12 shows a device 1200 for determining a channel width of a channel used in a wireless communication network, according to the present disclosure. The device 1200 is configured to carry out the method of the first embodiment described with regard to FIG. 11 above.

The device 1200 comprises a first determining unit (1202) configured to determine a quality indicator for each of a plurality of channels, a second determining unit (1204) configured to determine, from the plurality of channels, a first subset of channels, the quality indicators of which meeting a first requirement, a combining unit (1206) configured to combine at least two adjacent channels of the first subset of channels to a combined channel, and a performing unit (1208) configured to perform a listen before talk, LBT, operation in the combined channel.

Figure 13:
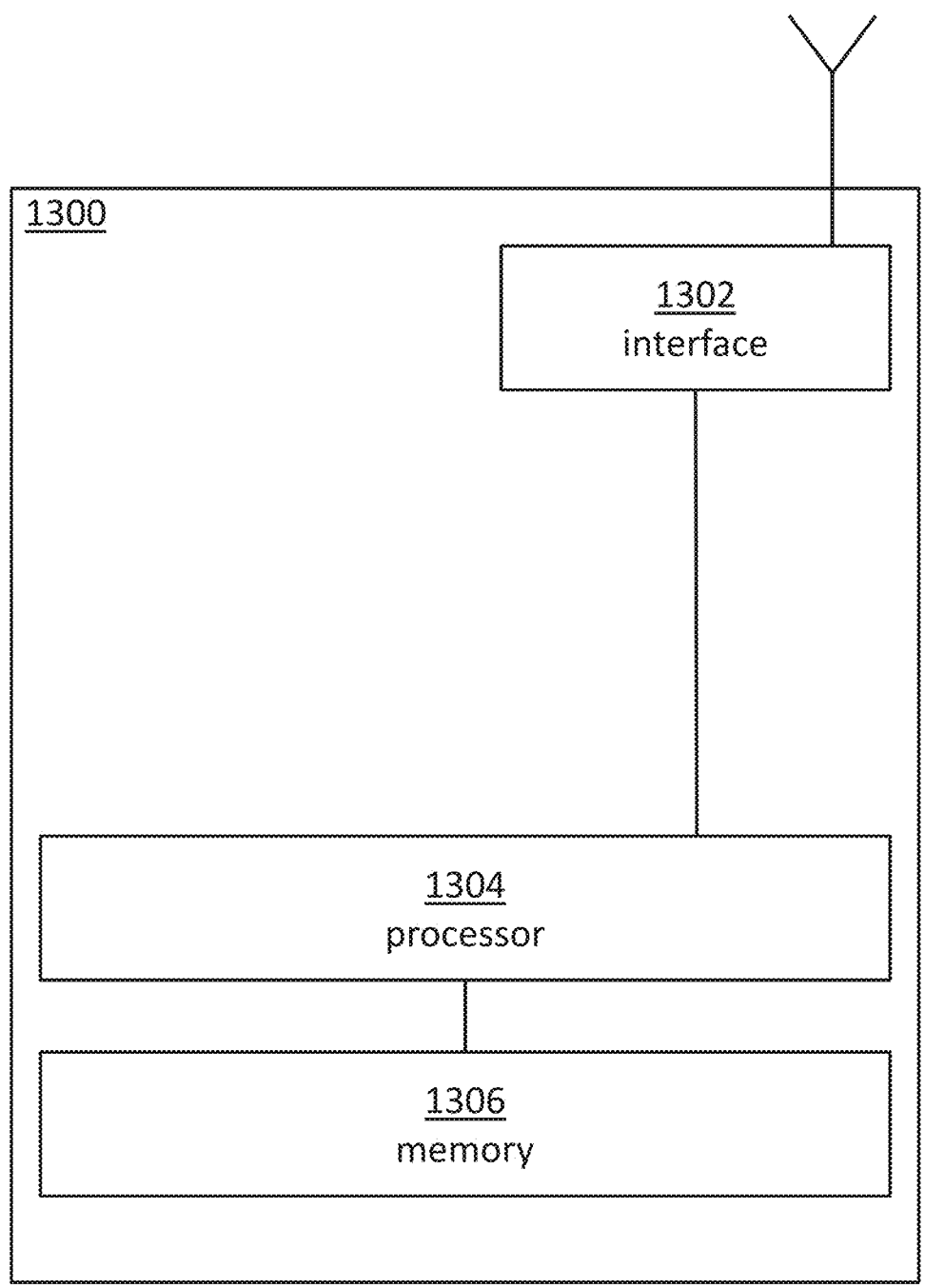
FIG. 13 shows a second schematic representation of a device for determining a channel width of a channel used in a wireless communication network, according to the present disclosure.

FIG. 13 shows a device 1300 for determining a channel width of a channel used in a wireless communication network, according to the present disclosure. The device 1300 may be configured to carry out the method of the first and/or second embodiment described with regard to FIGS. 11 and 14, respectively. Additionally or alternatively, the device 1300 may be configured to carry out the method of the third and/or fourth embodiment described with regard to FIGS. 17 and 19, respectively. The device 1300 may be or may comprise a wireless device or a radio node.

The device 1300 comprises a network interface 1302 that is adapted to communicatively couple the device to the wireless communication network. The device further comprises a processor 1304 and a memory 1306 containing instructions executable by the processor to cause the device 1300 to carry out any of the methods described in this disclosure. In particular, the memory 1306 may contain instructions executable by the processor to cause the device 1300 to carry out any of the methods according to the first to fourth embodiment.

Figure 14:
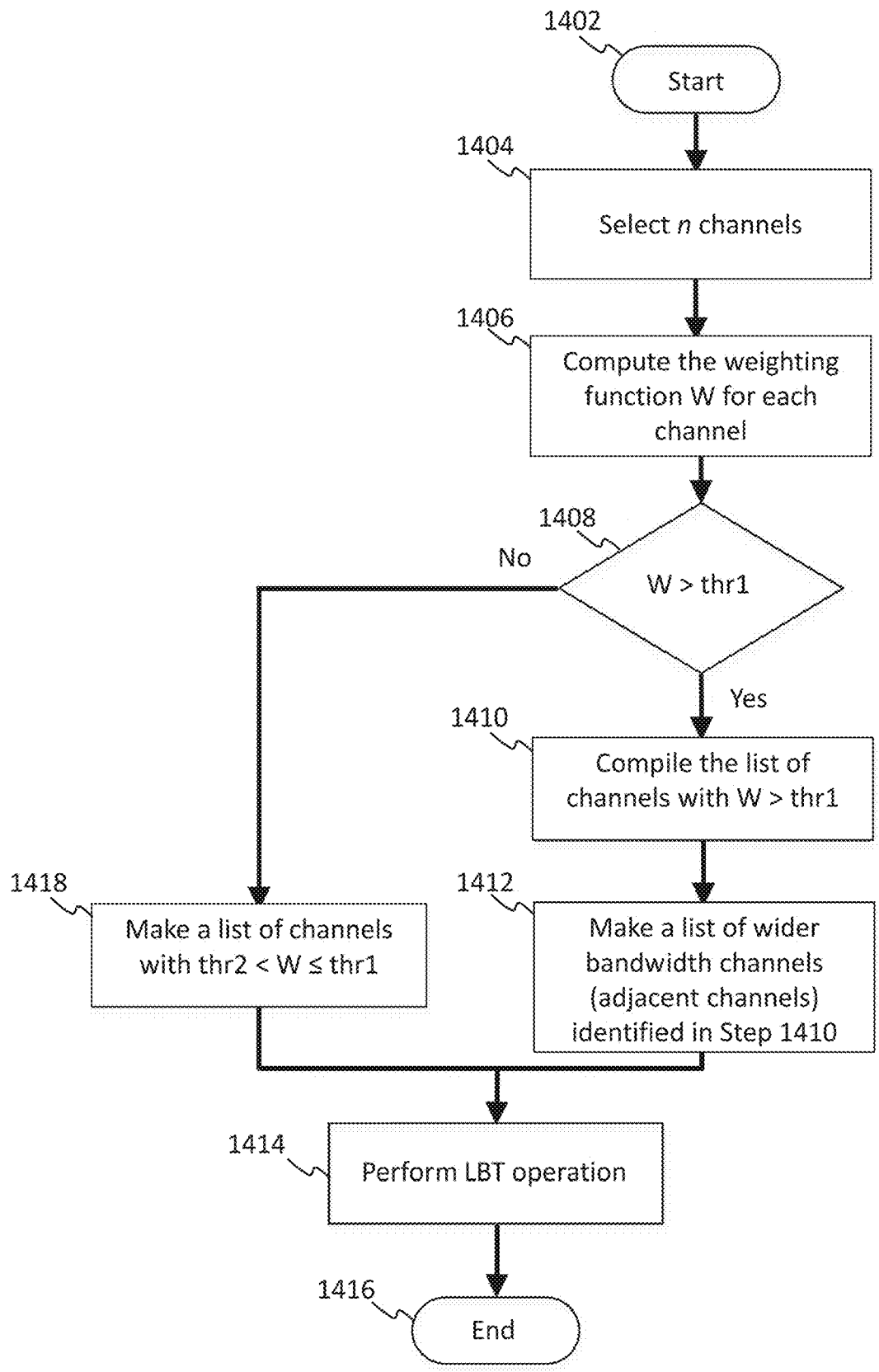
FIG. 14 shows a flowchart of a second embodiment of a method for determining a channel width of a channel used in a wireless communication network, according to the present disclosure.

FIG. 14 shows a flowchart of a method for determining a channel width of a channel used in a wireless communication network, according to a second embodiment of the present disclosure. The second embodiment may be regarded as a more detailed example, how the method according to the first embodiment may be carried out.

FIG. 14 shows a non-limiting example of selecting narrow band and wide band channels. The method starts at step 1402. A certain n number of channels are selected in Step 1404. These selected channels correspond to a "plurality of channels" according to the first embodiment. Here, the n channels may be the carriers with the least bandwidth or larger than those as custom defined by the system. These channels are used to form larger bandwidth channels. The n channels may or may not be of the same width.

A weighting function (quality indicator) W is computed for each channel in Step 1406. The weighting function is expressed as below:

$$W = w_1 \cdot P_1 + w_2 \cdot P_2 + w_3 \cdot P_3 + w_4 \cdot P_4 + w_5 \cdot P_5 + \ldots + w_i \cdot P_i \qquad (1)$$

Here, the parameters $P_1, P_2, \ldots P_i$ are the influencing factors/parameters and $w_1, w_2, \ldots w_i$ are their corresponding weights (weight values) indicating the importance of the parameters. The weighting factors could be pre-selected based on the scenario itself and can also be adapted later on according to the traffic characteristics, link/channel behavior and spectral conditions. The values for the weighting factors (weight values) are in the range [0, 1] and are normalized so that their sum equals to 1, $\Sigma_i w_i = 1$.

As non-limiting examples, these parameters may include the following. $P_1$ is the parameter which indicates link quality. This could be measured in terms of channel quality indicator (CQI) or similar, reliability metric (packet error ratio, block error ratio), etc.

$P_2$ indicates the cleanliness of the channel, I.e., Inverse of the detected RF energy.

$P_3$ indicates the historic behavior on the channel usage and bandwidth. This parameter captures a certain configurable number of the past attempts on the channel and the way channel bandwidth had been utilized. In order to give higher importance to more recent channel usage attempts, an exponential weighting can be used for the past attempts with highest weight assigned to the most recent history.

$P_4$ is a parameter indicating the presence of collocated networks. This would allow ranking the channel lower when it is also used by an existing collocated network.

$P_5$ is a parameter indicating the required QoS in terms of SNR, throughput or other metrics. This requirement may also be dependent on the type of the transmitted data.

$P_6$ is a parameter related to the regulatory limits, for instance on the allowed maximum output power, on the maximum allowed EIRP, Equivalent Isotropically Radiated Power, or on the allowed minimum and maximum channel bandwidth in the specific sub-band.

The weighting function could be extended with other parameters and proprietary product implementation features such as the subjected traffic characteristics, device capability, deployment scheme, policy constraints, etc.

If the value of the weighting function is larger than a certain configurable threshold (thr1), it is marked as a candidate for creating a wider bandwidth channel, see step 1408. The threshold thr1 can be pre-selected for a particular scenario or deployment setup as well as reconfigured (e.g., by the network) during the operation at runtime.

In Step 1410 of the flowchart in FIG. 14, all the (narrow band) channels with weighting function value larger than W are compiled. In other words, the channels having a weighting function (quality indicator) that meets a first requirement, namely W>thr1, are determined to belong to a first subset of channels.

In Step 1412, the channels adjacent to each other are combined to form wider bandwidth channels. While forming the wider bandwidth channels, the device capability (transmitter and receiver(s)) is considered as later described in the further embodiments. It may be considered important that the transmitter and receiver(s) are able to operate using the selected bandwidth. In Step 1418 in FIG. 14, those channels which have a weighting function below a certain configurable threshold (thr2) are discarded for the LET operation. These channels are neither part of the first subset nor part of a second subset of channels. Only channels, which meet the criterion (second requirement) of thr2 for the weighting function (quality indicator) are used in the LBT operation. In other words, the channels having a quality indicator not meeting the first requirement (W>thr1) but meeting the second requirement (W>thr2) are determined to belong to a second subset of channels.

The threshold thr2 can be pre-selected based on the application use-case and deployment setup, and can also be reconfigured on-the-fly. In one case, it can assume a value of zero—thereby allowing all the channels to be considered in the LBT operation. In another case it can assume a value of infinity (or another very high value), such that none of the channels not meeting the first requirement (W>thr1) at step 1408 are considered in the LBT operation.

In Step 1414 LBT operation is carried out in narrowband channels as well as wideband channels. The carrier sensing threshold for narrow and wider bandwidth carriers can be different depending upon the carrier bandwidth itself, regional regulations or product implementation specific details. The follow-up transmission would be carried out on channels with narrow as well as wide bandwidths after the success of the LBT operation. The method ends at step 1416.

In the carrier width selection procedure described in this disclosure, the weighting function allows selecting wideband channels with high enough quality (low interference, link quality, etc.) that in turn would lead to high QoS (cf. throughput, reliability, etc.). This aspect of maximizing the throughput and reliability in the disclosure is supported by the extensive measurement results reported in the paper by Deek et al. for IEEE 802.11n based Wi-Fi network.

Thus, FIG. 14 shows a non-limiting example flowchart of the method for selecting narrow and wide bandwidth channels. A certain n number of (narrowband) channels are selected and the weighting function W is computed for each channel. If the weighting function for a channel has a value higher than a certain configurable threshold thr1, it becomes a candidate for forming a wide bandwidth channel (it belongs to the first subset). The narrowband channels adjacent to each other and having a weighting function larger than thr1 are bonded as a wide channel. The channels which cannot be bonded in Step 1412 as a wide channel and the channels for which the weighting function value W is above another configurable threshold thr2, are selected as narrowband channels (they belong to the second subset). Both wide bandwidth and selected narrowband channels are used in the LBT operation in step 1414.

Figure 15:
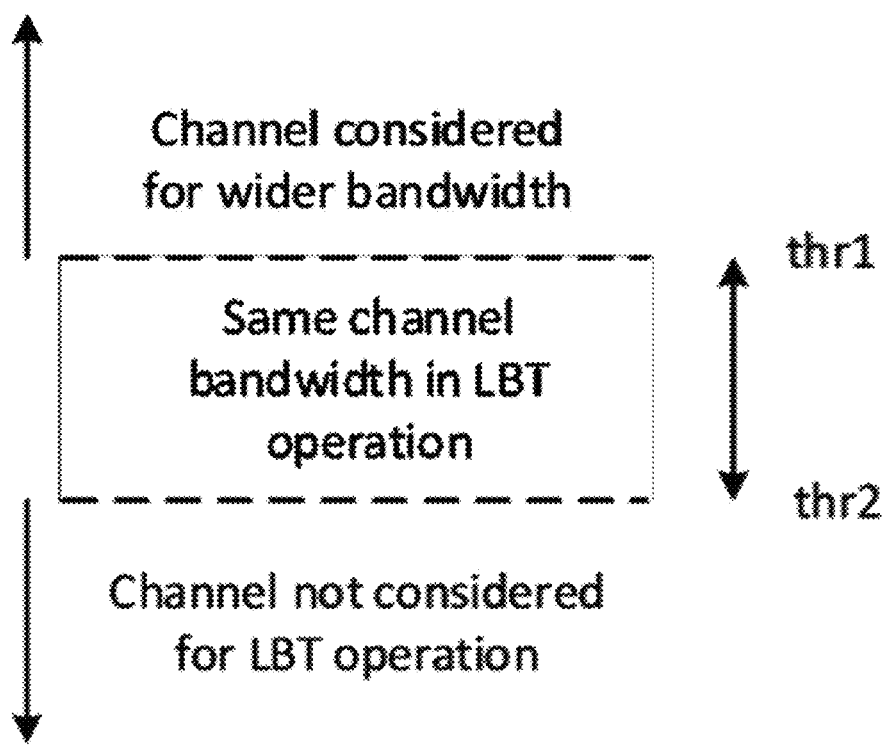
FIG. 15 shows a schematic representation of a decision whether a channel of the plurality of channels belongs to the first subset, the second subset, or not to any of the first or second subset.

FIG. 15 shows how, based on the weighting function value, a channel is considered for wider bandwidth (first subset), same bandwidth (second subset) or discarded in the LOT operation (no subset). The above is determined by comparing against thresholds thr1 and thr2. In other words, FIG. 15 illustrates the selection process of steps 1408 and 1418 of FIG. 14 above.

FIG. 15 shows an illustration of the three regions when evaluating the weighting function W. If the weighting function for a channel has a value higher than the threshold thr1, it is considered for aggregation as a wide bandwidth channel in Step 1412 in FIG. 14. If the weighting function has a value lower than the threshold thr2, it is simply discarded and not considered for performing the LBT operation. For channels with weighting function values between thr1 and thr2, LBT operation is performed on narrow bandwidth channels without aggregation as wide bandwidth channels (they belong to the second subset). It should be noted that the weighting function thresholds thr1 and thr2 are configurable. It should also be noted that the minimum requirement on the CCA threshold can be different for different channel bandwidths and across different frequency bands.

FIG. 16 shows various steps in the channel width selection process as a non-limiting example. Thus, FIG. 16 illustrates the various steps involved in the channel width selection process of the second embodiment described above. The first row 1602 of FIG. 16 shows channels 1 to 15 that may be available in a particular frequency range. In the second row 1604 of the non-limiting example illustration in FIG. 16, channels 2, 3, 4, 8, 9, 13, 14 and 15 are selected (cf. Step 1414 of the flowchart in FIG. 14).

The third row 1606 in FIG. 16 with dotted boxes indicate that the channels 2, 3, 9, 13 and 14 have a weighting function value (W) greater than the threshold thr1 (cf. Step 1410 in FIG. 14). Channel 4 has a weighting function in the range (thr2, thr1] (cf. Step 1418 in FIG. 14), whereas channels 8 and 15 have a weighting function value lower or equal to the threshold thr2, and hence are not considered in the following LBT operation. The fourth row 1608 in FIG. 16 indicates that channels 2 and 3 and channels 13 and 14 are combined to form wider bandwidth channels while channels 4 and 9 are used as narrowband channels in the follow-up LBT operation 1414. It should be noted that the CCA threshold for channels with different bandwidths can be different.

Figure 17:
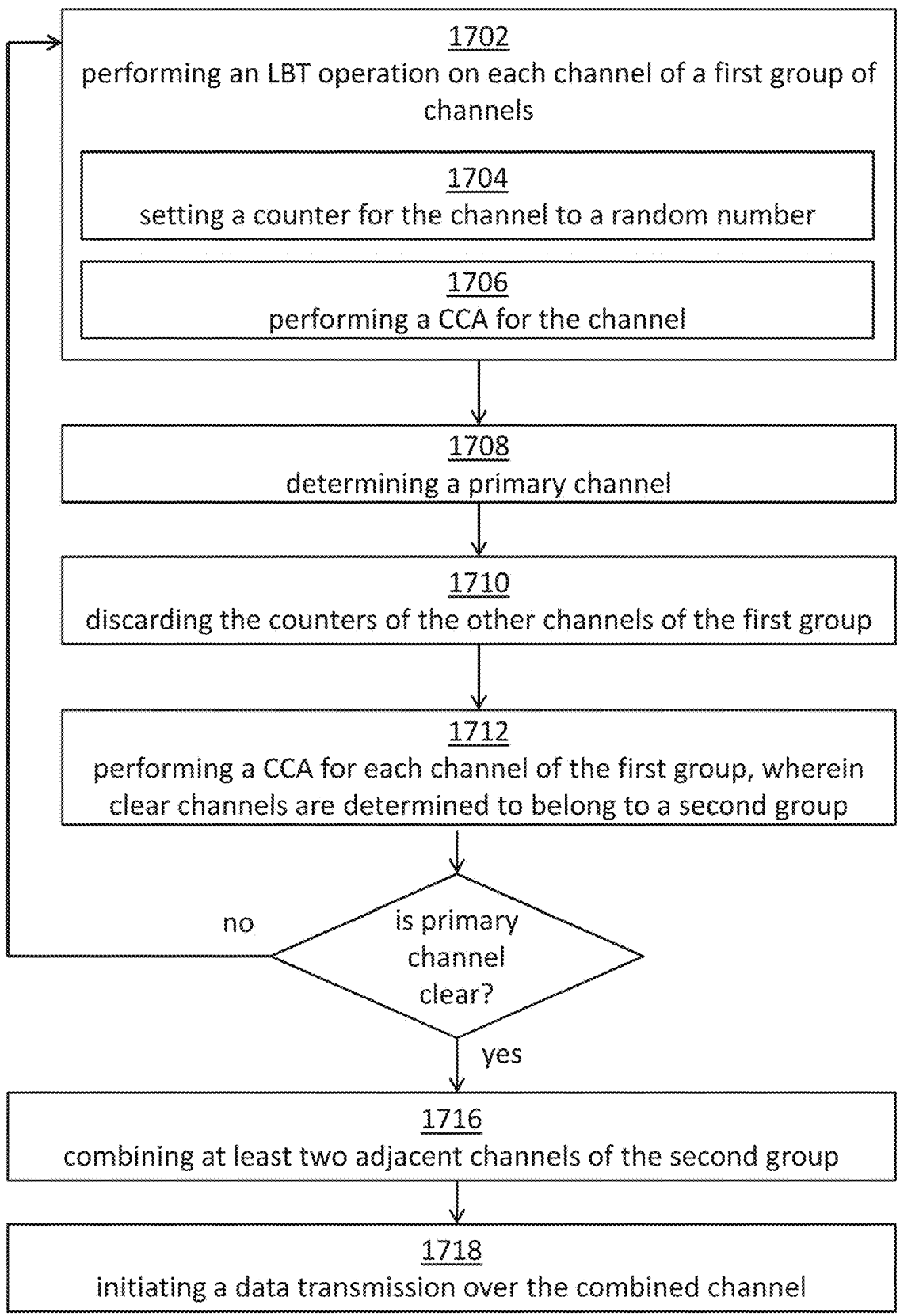
FIG. 17 shows a flowchart of a third embodiment of a method for determining a channel width of a channel used in a wireless communication network, according to the present disclosure.

FIG. 17 shows a flowchart of a method for determining a channel width of a channel used in a wireless communication network, according to a third embodiment of the present disclosure. The method may be carried out by any of the devices described in the present disclosure. In particular, the method may be carried out by any of the devices shown in FIG. 12, FIG. 13, and FIG. 18. The device carrying out the method may be, e.g., a wireless device or a radio node. Further, the method may be carried out by a cloud computing device and/or by a plurality of devices that may be geographically distributed and that may comprise a plurality of processors and/or a plurality of memories.

Figure 19:
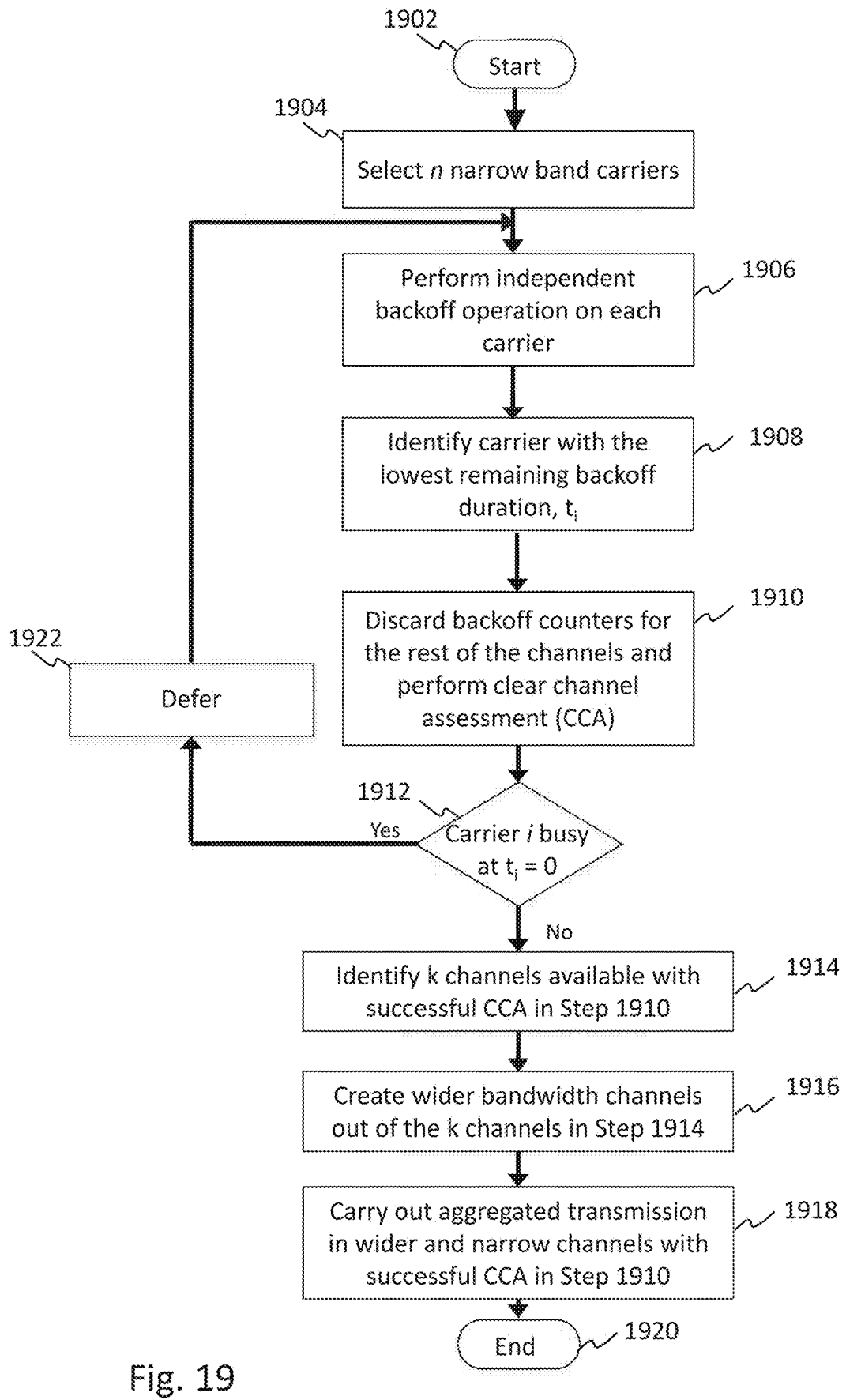
FIG. 19 shows a flowchart of a fourth embodiment of a method for determining a channel width of a channel used in a wireless communication network, according to the present disclosure.

FIG. 17 and FIG. 19 generally apply to the license assisted case or when the receivers have knowledge on which channels to scan/listen for the potential transmission possibly at known time instants. Determining the primary carrier in a dynamic fashion requires that the rendezvous problem is resolved which can be fairly easy using the licensed carrier.

When the information on which channel(s) to scan at a given time is not known to a receiver (for instance in the case of standalone operation in the unlicensed spectrum), it may implement an algorithm to identify the channel(s) used for transmission. One such scheme to dynamically resolve this rendezvous problem is described in: "A decentralized MAC protocol for opportunistic spectrum access in cognitive wireless networks" by Junaid Ansari, Xi Zhang, Petri Mähönen, see https://www.semanticscholar.org/paper/A-decentralized-MAC-protocol-for-opportunistic-Ansari-Zhang/958a9e4009ba84497d3e23e1d84580f05de269c5/pdf.

The method shown in FIG. 14 is more generic and applicable, e.g., to both standalone and license assisted cases. Similarly, the methods of FIG. 15 and FIG. 16 are generic.

The method of FIG. 17 comprises a step 1702 of performing a listen before talk, LBT, operation in each channel of a first group of channels. The listen before talk, LBT, operation comprises for each channel a step 1704 of setting a counter associated with the respective channel to a random integer number and a step 1706 of performing a clear channel assessment, CCA, for the respective channel, wherein the counter is decreased by one in case the channel is determined to be clear and wherein the counter maintains its value in case the channel is determined to be occupied. The method further comprises a step 1708 of determining the channel, the counter of which first reaching a value of one, to be a primary channel and a step 1710 of discarding the counters of the channels of the first group of channels, which are not the primary channel. The method further comprises a step 1714 of performing a clear channel assessment, CCA, for each channel of the first group of channels, by which it is determined whether the respective channel is clear or occupied and by which the clear channels are determined to belong to a second group of channels. The method further comprises, in case the primary channel is determined to be clear, a step 1716 of combining at least two adjacent channels of the second group of channels to a combined channel and a step 1718 of initiating a data transmission over at least the combined channel. In case the primary channel is determined to be occupied, the method further comprises reiterating the step 1702 of performing a listen before talk, LBT, operation, the step 1708 of determining a primary channel, the step of discarding the counters and the step 1712 of performing a clear channel assessment, CCA.

Figure 18:
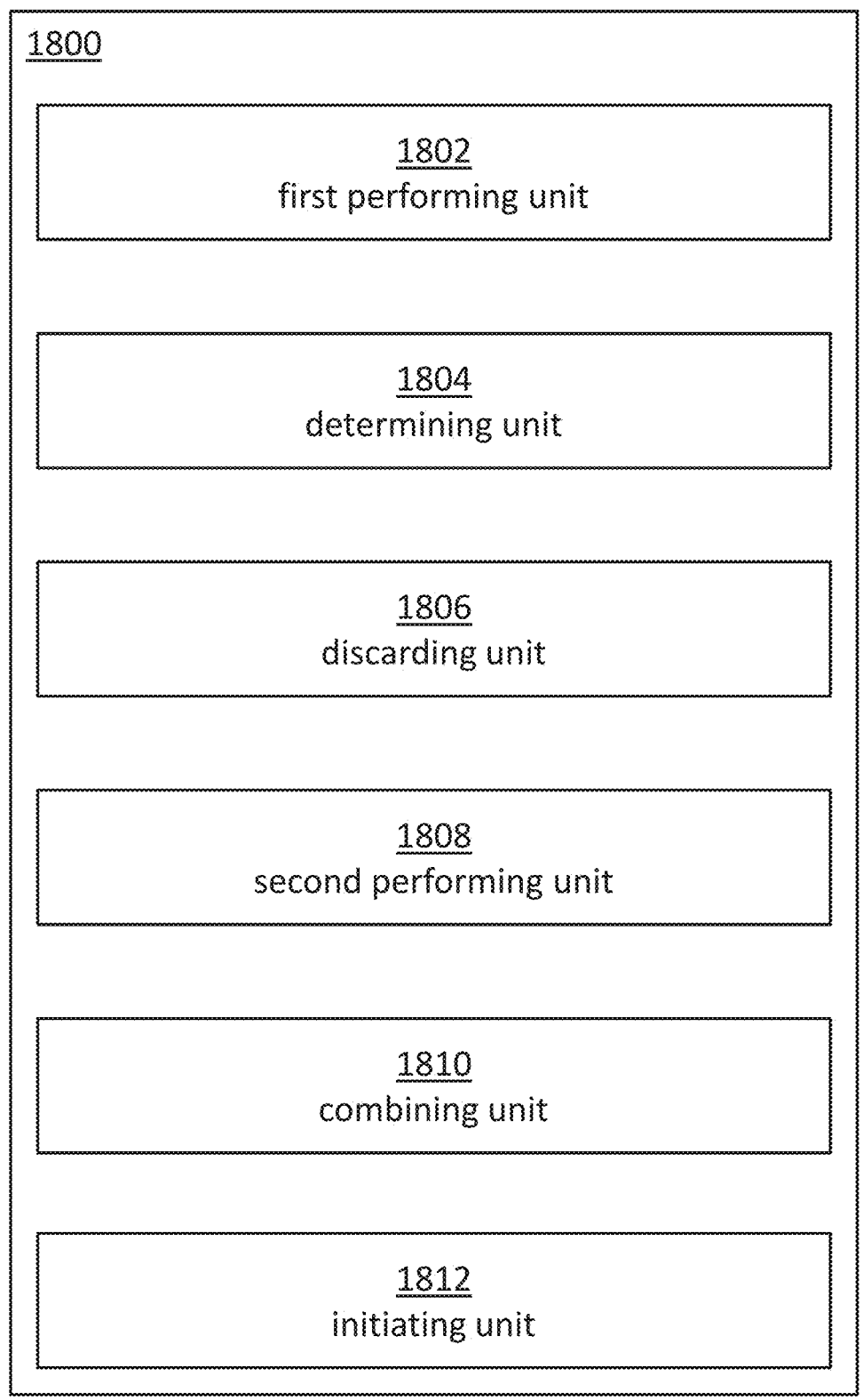
FIG. 18 shows a first schematic representation of a device for determining a channel width of a channel used in a wireless communication network, according to the present disclosure.

FIG. 18 shows a device 1800 for determining a channel width of a channel used in a wireless communication network, according to the present disclosure. The device 1800 is configured to carry out the method of the third embodiment described with regard to FIG. 17 above.

The device 1800 comprises a first performing unit 1802 configured to perform a listen before talk, LBT, operation in each channel of a first group of channels, wherein the listen before talk, LBT, operation comprises for each channel setting a counter associated with the respective channel to a random integer number and performing a clear channel assessment, CCA, for the respective channel, wherein the counter is decreased by one in case the channel is determined to be clear and wherein the counter maintains its value in case the channel is determined to be occupied. The device 1800 further comprises a determining unit 1804 configured to determine the channel, the counter of which first reaching a value of one, to be a primary channel, a discarding unit 1806 configured to discard the counters of the channels of the first group of channels, which are not the primary channel, a second performing unit 1808 configured to perform a clear channel assessment, CCA, for each channel of the first group of channels, by which it is determined whether the respective channel is clear or occupied and by which the clear channels are determined to belong to a second group of channels, a combining unit 1810 configured to, in case the primary channel is determined to be clear, combine at least two adjacent channels of the second group of channels to a combined channel and an initiating unit 1812 configured to, in case the primary channel is determined to be clear, initiate a data transmission over at least the combined channel.

FIG. 19 shows a flowchart of a method for determining a channel width of a channel used in a wireless communication network, according to a fourth embodiment of the present disclosure. The fourth embodiment may be regarded as a more detailed example, how the method according to the third embodiment may be carried out.

The method shown in FIG. 19 may be regarded as an alternate method (with regard to the first and second embodiment) for selecting narrow and wide bandwidth channels, and subsequently carrying out aggregated transmissions. However, the method of FIG. 19 according to the fourth embodiment may also be carried out in combination with the method of the first or second embodiment.

The major difference between the methods in FIG. 19 and FIG. 14 is that in FIG. 14, a weighting function based decision is taken on selecting the channel bandwidths before the LBT operation is performed while in the method described in FIG. 19, channels are combined when possible during the LBT operation. Also the method of FIG. 14 may be regarded as generic and applies to both license assisted and standalone mode of operations while FIG. 19 on the other hand is generally applicable for license assisted case or when the rendezvous problem could be solved in a dynamic manner, e.g., using a distributed algorithm.

The flowchart in FIG. 19 shows that the full random backoff procedure, or "LBT procedure", (when required and exercised) is carried out only in the channel with the shortest backoff counter in order to win the channel in the fastest possible manner. Other channels are aggregated to it. The channel in which the full backoff procedure is carried out is referred to as the primary channel and other channels are referred to as the secondary channels.

The method starts at step 1902. In Step 1904, a certain number of n channels are selected. These channels may constitute the least possible bandwidth as well as wide bandwidth channels as custom defined by the system, and are used to potentially form wider bandwidth channels. These n channels can either be of the same bandwidth or different bandwidths. The CCA threshold for channels with different bandwidths can be different.

An independent LBT operation in all these n channels is performed in step 1906. The LBT operation performed in step 1906 may correspond (or may be similar) to that described with regard to FIG. 6. A counter is assigned to each of the channels in which the LBT procedure is carried out, wherein the counter is initialized by setting it to a random number (a random integer number). Clear Channel Assessments (CCAs) are performed in predetermined time intervals, wherein every time the respective channel is determined to be clear, the counter is decreased by one. In case the channel is determined to be occupied, the counter maintains its value (it is "frozen").

In step 1908, the channel with shortest remaining backoff counter with duration $t_i$ is identified out of the total n channels, i.e., $t_i \in [t_1, t_n]$ such that $t_i = \min([t_1, t_n])$. The LBT operation in FIG. 19 has the element of selecting the carrier with smallest remaining backoff interval (i.e., dynamic primary channel).

As can be seen from the flowchart in FIG. 19, after having found secondary channels with successful quick clear channel assessment (CCA) in step 1914, wider bandwidth channels are created in step 1916 and later on transmission is carried out in aggregated narrow and wide carriers, see step 1918.

In step 1908 it is waited and checked until $t_i$=X. When that requirement is met, the counter with shortest remaining backoff counter is found and the method proceeds to step 1910. Here, X represents the remaining interval at which other carriers can be directly checked for potential aggregation and can subsequently carry out transmission upon the success of the CCA operation. As a non-limiting example for the 5 GHz unlicensed spectrum, this interval can be 25 microseconds.

In the licensed assisted mode of operation, the primary channel can be dynamically chosen as the rendezvous problem can be solved using always present licensed carrier while in the standalone operation the primary channel has to be known beforehand in a static or semi-static manner.

In step 1910, the backoff counters of the channels other than the primary channel are discarded. Then, a "final" clear channel assessment (CCA) is carried out in each channel, wherein it is also identified in step 1912 whether the primary channel (carrier I) is busy at $t_i$=0 or not.

In case the primary channel is not busy, the method proceeds to step 1914, where the channels (k channels) are identified, which have been clear in the CCA at step 1910. In step 1916 at least two adjacent channels of the k channels identified in step 1914 are combined to one wider bandwidth channel. For example, all channels that are adjacent to each other may be combined to respective combined channels.

In step 1918, data transmission is carried out in the wider channel(s) that has/have been combined in step 1916 and in the other narrow channels that have been identified as being available in step 1914.

In case the primary channel is busy/occupied in step 1912, the transmission is deferred (step 1922) and the method returns to step 1904. After that, steps 1906, 1908, 1910, and 1912 are repeated and it is checked again, whether the channel which is now identified as the primary channel is occupied or clean. In case this new primary channel is clean, the method proceeds with step 1914 and in case the new primary channel is occupied, the method again proceeds to the defer step 1922. The method ends at step 1920.

As to another optional aspect, the device may perform simultaneous multiple LBT on multiple channels having different bandwidth (BW) (e.g., First LBT on a 20 MHz channel (channel # x), second LBT on a 40 MHz channel, covering channel # x as well as channel # y where x is a part of y, a third LBT on a 60 MHz channel, etc.) and select the most suitable channel BW based on a pre-defined or even a per-transmission criteria such as use case, scenario, type of transmitted data, QoS requirements, requirements on throughput, or a combination of above, etc. In this way the risk of losing the whole large bandwidth channel in case the LBT fails can be minimized, and potentially LBT operation on narrow carrier bandwidths would be successful. This means that in the aforementioned non-limiting examples, a device can perform LBT in 20 MHz channel and it simultaneously also perform LBT in 40 MHz channel, 60 MHz channel, etc. This method has the advantage that the energy detection threshold for non-Wi-Fi technologies in the 5 GHz as per the new ETSI HS is −72 dBm regardless of the bandwidth. In this way, there is no need to wait for a configurable waiting time so that LBT can be finalized in the different carriers before they can be combined. Of course, for spectrum bands, where different thresholds are exercised depending upon the bandwidth due to regional regulations or algorithmic implementation, the benefits can be different. The selection of energy detection threshold governs a tradeoff when it comes to the performance characteristics. Having a higher energy detection threshold may reduce the probability of success of LBT but at the same time the inflicted interference to other collocated transmissions is lower, leading to higher throughput and reliability for other transmissions. A lower threshold on the other hand allows hearing further away nodes and having higher chances of successful LBT but may means selection of lower Modulation Coding Scheme (MCS) as the transmissions might be more open to interference from other collocated transmissions. Generally, there is a regulated baseline energy detection threshold and/or technology specific established threshold to support spectral coexistence and minimizing harmful interference.

In the following, aspects (examples) are described that may be applied in the aforementioned detailed embodiments (first to fourth embodiment), either in addition or as an alternative to some of the aforementioned features.

One embodiment comprises selecting only one carrier in the unlicensed spectrum at a given time.

One embodiment comprises selecting two or more carriers in the unlicensed spectrum at a given time.

One embodiment comprises selecting carriers of the same bandwidths at a given time instance.

One embodiment comprises aggregating carriers of varying (mixed) bandwidths. As a non-limiting example, this may include aggregation of 20 MHz and 40 MHz bandwidths.

One embodiment comprises aggregating channels belonging to the same frequency sub-band or band.

Another embodiment comprises aggregating channels belonging to different frequency sub-bands or bands.

One embodiment comprises supporting licensed assisted operation, where there is always available licensed spectrum carrier(s). LBT operation is not required in the licensed spectrum. In the licensed assisted operation, additional carrier(s) are selected and aggregated in the unlicensed spectrum. The selection of carriers in the unlicensed spectrum also implies their bandwidth selection. License assisted operation gives more agility and flexibility in selecting the unlicensed carrier(s) as the rendezvous information (i.e., which frequency carriers to use) can be conveyed in the always available licensed carrier(s).

One embodiment comprises supporting standalone operation in the unlicensed spectrum, where a semi-static primary carrier can be assumed similar to Wi-Fi. However, unlike Wi-Fi, NR or other systems are not necessarily bound to aggregating to the same bandwidth adjacent frequency carrier.

While the LBT operation and transmission/reception carried out using a certain carrier width also depend upon the device capability, the carrier width selection takes into account the device capability. The transmitter makes sure that the transmission in aggregated carriers is decodable (i.e., can be received successfully) at the intended receiver(s). Therefore, the carrier width selection governs the constraint from both transmitter and receiver(s) hardware capabilities.

The carrier sensing threshold for the LBT operation can be dependent upon the regional regulations, and is selected based on the carrier bandwidth or implementation specific features. If applicable, the carrier sensing threshold has to meet the minimum regulatory requirements. The carrier sensing threshold can be pre-selected for a particular bandwidth or can be reconfigured at runtime, e.g., by the network/the network operator or by the device performing the method.

While the regulations for out-of-band (OOB) emission can be different across different frequency sub-bands, the transmitter needs to select the number of subcarriers required for guard according to the frequency band regulations. This knowledge can be pre-programmed and can be also reconfigured. Moreover, depending upon the frequency band, the carriers lying at the edge of the frequency sub-band impose much tighter requirements on the OOB emission.

The data to be transmitted on the available aggregated carriers can be either prepared beforehand for the possible combination of carriers depending upon the outcome of the LBT operation or quickly build up after the LBT operation is concluded depending upon the availability of carriers and their bandwidth (i.e., upon the success of the LOT operations).

As has become apparent from the above description, the technique according to the present disclosure allows transmitting equipment operating in the unlicensed spectrum or license shared spectrum to dynamically select and aggregate carriers of different bandwidths based on the data traffic requirements, channel behavior and spectral conditions. The carrier width selection is carried out in a manner to exploit wider bandwidth whenever possible to effectively reduce the guard subcarrier overhead (thereby increasing the spectrum utilization efficiency) and to simplify the LBT operation. Moreover, when using a large contiguous bandwidth is not possible, carriers with narrow width can be selected to keep the agility in order to utilize the narrower portions of the spectrum for potential transmissions. Some of the methods allow dynamically selecting and aggregating carriers of varying bandwidth as well.

Some of the methods allows NR or other future communication systems to work in the licensed assisted mode (where there is at least one "primary" carrier in the licensed spectrum) as well as in the standalone operation only in the unlicensed spectrum. The carriers can be in the same or different spectrum bands.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the embodiments can be varied in many ways, it will be recognized that the present disclosure should be limited only by the scope of the following embodiments.

The invention claimed is:

1. A method for determining a channel width of a channel used in a wireless communication network, the method comprising:
    determining a quality indicator for each of a plurality of channels by multiplying each of a plurality of considered parameters with a predefined weight value to obtain weighted parameters and determining the quality indicator based on the sum of the weighted parameters, wherein the considered parameters comprise one or more of the following parameters:
    link quality;
    cleanliness of the respective channel;
    historic behavior on the channel usage and on the channel bandwidth;
    presence of collocated wireless communication networks;
    required quality of service (QoS) in terms of signal to noise ratio, SNR;
    regulatory limits of an allowed maximum output power and/or maximum Equivalent Isotropically Radiated Power (EIPR) limits;
    regulatory limits of an allowed minimum and/or maximum channel bandwidth in a sub-band, in which the respective channel is located;
    device capability of the device;
    deployment scheme; and
    policy constraints;
    determining, from the plurality of channels, a first subset of channels, the quality indicators of which meet a first requirement;
    combining at least two adjacent channels of the first subset of channels to form a combined channel; and
    performing a listen before talk (LBT) operation in the combined channel.

2. The method of claim 1, further comprising:
    determining, from the plurality of channels which are not part of the first subset, a second subset of channels, the quality indicators of which meet a second requirement;
    performing an LBT operation in at least one channel of the second subset.

3. The method of claim 2, further comprising:
    performing an LBT operation in each of the combined channels and, if existent, in each channel of the first subset that has not been combined to a combined channel, and in each of the channels of the second subset.

4. The method of claim 2, wherein the second requirement defines that a value of the respective quality indicator is above a second threshold value.

5. The method of claim 1, wherein the first requirement defines that a value of the respective quality indicator is above a first threshold value.

6. The method of claim 1, further comprising:
    determining, for each channel of the first subset, whether the channel has an adjacent channel, which is also part of the first subset, thereby identifying a plurality of groups of adjacent channels in the first subset; and
    combining the channels of each of the plurality of groups of adjacent channels to respective combined channels.

7. The method of claim 1, further comprising:
    performing an LBT operation in each of the combined channels and, if existent, in each channel of the first subset that has not been combined to a combined channel.

8. The method of claim 1, wherein the plurality of channels comprises at least one channel in an unlicensed frequency spectrum.

9. The method of claim 1, wherein the LBT operation is performed such that it is checked whether the channel in which the LBT operation is performed is clear or occupied, and wherein the listen before talk (LBT) operation is performed such that the channel in which the listen before talk (LBT) operation is performed is determined to be clear in the event that an energy level in that channel is below a predefined threshold value and the channel in which the listen before talk (LBT) operation is performed is determined to be occupied in the event that the energy level in that channel is above the predefined threshold value.

10. The method of claim 9, further comprising:
    setting the predefined threshold value in dependence of the channel width of the channel in which the LBT operation is performed.

11. The method of claim 9, further comprising:
    setting the predefined threshold value in dependence of a frequency region, in which the channel in which the operation is performed is located.

12. The method of claim 1, further comprising:
initiating a data transmission using carrier aggregation, wherein at least one of the channels, which have been determined to be clear in the LBT operation, is used for carrier aggregation with another channel.

13. A method for determining a channel width of a channel used in a wireless communication network, the method comprising:
performing a listen before talk (LBT) operation in each channel of a first group of channels, wherein the LBT operation comprises, for each channel, setting a counter associated with the respective channel to a random integer number and performing a clear channel assessment (CCA) for the respective channel, wherein the counter is decreased by one responsive to determining that the channel is clear and wherein the counter maintains its value in the event that the channel is determined to be occupied;
determining the channel, the counter of which first reaching a value of one, to be a primary channel;
discarding the counters of the channels of the first group of channels, which are not the primary channel;
performing a CCA for each channel of the first group of channels, by which it is determined whether the respective channel is clear or occupied and by which the clear channels are determined to belong to a second group of channels; and
responsive to determining that the primary channel is clear:
combining at least two adjacent channels of the second group of channels to form a final combined channel; and
initiating a data transmission over at least the final combined channel;
wherein the method further comprises, before the step of performing the LBT operation in each channel of a first group of channels:
determining a quality indicator for each of a plurality of channels;
determining, from the plurality of channels, a first subset of channels, the quality indicators of which meeting a first requirement;
combining at least two adjacent channels of the first subset of channels to form a first combined channel; and
determining that at least the first combined channel belongs to the first group of channels.

14. The method of claim 13, further comprising, responsive to determining that the primary channel is clear:
determining, for each channel of the second group, whether the channel has an adjacent channel, which is also part of the second group, and thereby identify a plurality of groups of adjacent channels in the second group;
combining the channels of each of the plurality of groups of adjacent channels to respective combined channels; and
initiating a data transmission using carrier aggregation, wherein at least each of the combined channels and, if existent, each channel of the second group, which has not been combined to a combined channel, are used for carrier aggregation.

15. The method of claim 13, further comprising, responsive to determining that the primary channel is occupied, reiterating the steps of:
performing a LBT operation;
determining a primary channel;
discarding the counters; and
performing a CCA.

16. The method of claim 13, wherein the plurality of channels comprises at least one channel in an unlicensed frequency spectrum.

17. The method of claim 13, wherein the CCA is performed such that the channel in which the CCA is performed is determined to be clear in the event that an energy level in that channel is below a predefined threshold value and the channel in which the CCA is performed is determined to be occupied in the event that the energy level in that channel is above the predefined threshold value.

18. The method of claim 17, further comprising:
setting the predefined threshold value in dependence of the channel width of the channel in which the CCA is performed.

19. The method of claim 17, further comprising:
setting the predefined threshold value in dependence of a frequency region in which the channel in which the CCA is performed is located.

20. A device for determining a channel width of a channel used in a wireless communication network, the device comprising:
a network interface that is adapted to communicatively couple the device to the wireless communication network;
a processor; and
a memory containing instructions executable by the processor to cause the device to:
determine a quality indicator for each of a plurality of channels by multiplying each of a plurality of considered parameters with a predefined weight value to obtain weighted parameters and determining the quality indicator based on the sum of the weighted parameters, wherein the considered parameters comprise one or more of the following parameters:
link quality;
cleanliness of the respective channel;
historic behavior on the channel usage and on the channel bandwidth;
presence of collocated wireless communication networks;
required quality of service (QoS) in terms of signal to noise ratio, SNR;
regulatory limits of an allowed maximum output power and/or maximum Equivalent Isotropically Radiated Power (EIPR) limits;
regulatory limits of an allowed minimum and/or maximum channel bandwidth in a sub-band, in which the respective channel is located;
device capability of the device;
deployment scheme; and
policy constraints;
determine, from the plurality of channels, a first subset of channels, the quality indicators of which meet a first requirement;
combine at least two adjacent channels of the first subset of channels to form a combined channel; and
perform a listen before talk (LBT) operation in the combined channel.

21. The device of claim 20, further configured to:
determine, from the plurality of channels which are not part of the first subset, a second subset of channels, the quality indicators of which meet a second requirement; and perform a LBT operation in at least one channel of the second subset.

22. The device of claim 21, further configured to:
perform a LBT operation in each of the combined channels and, if existent, in each channel of the first subset that has not been combined to a combined channel, and in each of the channels of the second subset.

23. The device of claim 20, further configured to:
determine, for each channel of the first subset, whether the channel has an adjacent channel, which is also part of the first subset, and thereby identify a plurality of groups of adjacent channels in the first subset; and
combine the channels of each of the plurality of groups of adjacent channels to respective combined channels.

24. The device of claim 23, further configured to:
perform a listen before talk (LBT) operation in each of the combined channels and, if existent, in each channel of the first subset, which has not been combined to a combined channel.

25. The device of claim 20, wherein the plurality of channels comprises at least one channel in an unlicensed frequency spectrum.

26. The device of claim 20, wherein the device is configured to perform the listen before talk (LBT) operation such that it is checked whether the channel in which the listen before talk (LBT) operation is performed is clear or occupied.

27. The device of claim 26, wherein the device is configured to perform the listen before talk (LBT) operation such that the channel in which the listen before talk (LBT) operation is performed is determined to be clear in the event that an energy level in that channel is below a predefined threshold value and the channel in which the listen before talk (LBT) operation is performed is determined to be occupied in the event that the energy level in that channel is above the predefined threshold value.

28. The device of claim 27, wherein the device is configured to set the predefined threshold value in dependence of the channel width of the channel in which the listen before talk (LBT) operation is performed.

29. The device of claim 27, wherein the device is configured to set the predefined threshold value in dependence of a frequency region in which the channel in which the listen before talk (LBT) operation is performed is located.

30. The device of claim 20, wherein the device is further configured to initiate a data transmission using carrier aggregation, wherein at least one of the channels, which have been determined to be clear in the listen before talk (LBT) operation, is used for carrier aggregation with another channel.

31. A device for determining a channel width of a channel used in a wireless communication network, the device comprising:
a network interface that is adapted to communicatively couple the device to the wireless communication network;
a processor; and
a memory containing instructions executable by the processor to cause the device to:
perform a listen before talk (LBT) operation in each channel of a first group of channels, wherein the LBT operation comprises, for each channel, setting a counter associated with the respective channel to a random integer number and performing a clear channel assessment (CCA) for the respective channel, wherein the counter is decreased by one responsive to a determination that the channel is clear and wherein the counter maintains its value in the event that the channel is determined to be occupied;
determine the channel, the counter of which first reaching a value of one, to be a primary channel;
discard the counters of the channels of the first group of channels, which are not the primary channel;
perform a CCA for each channel of the first group of channels, by which it is determined whether the respective channel is clear or occupied and by which the clear channels are determined to belong to a second group of channels; and
responsive to determining the primary channel clear:
combine at least two adjacent channels of the second group of channels to form a final combined channel; and
initiate a data transmission over at least the final combined channel;
wherein the instructions are further configured to cause the device to, before performing the LBT operation in each channel of a first group of channels:
determine a quality indicator for each of a plurality of channels;
determine, from the plurality of channels, a first subset of channels, the quality indicators of which meeting a first requirement;
combine at least two adjacent channels of the first subset of channels to form a first combined channel; and
determine that at least the first combined channel belongs to the first group of channels.

32. The device of claim 31, further configured to, responsive to determining that the primary channel is clear:
determine, for each channel of the second group, whether the channel has an adjacent channel, which is also part of the second group, and thereby identify a plurality of groups of adjacent channels in the second group;
combine the channels of each of the plurality of groups of adjacent channels to respective combined channels; and
initiate a data transmission using carrier aggregation, wherein at least each of the combined channels and, if existent, each channel of the second group, which has not been combined to a combined channel, are used for carrier aggregation.

33. The device of claim 31, further configured to,
responsive to determining that the primary channel is occupied, reiterate the steps of:
performing a LBT operation;
determining a primary channel;
discarding the counters; and
performing a CCA.

34. The device of claim 31, wherein the plurality of channels comprises at least one channel in an unlicensed frequency spectrum.

35. The device of claim 31, wherein the device is configured to perform the CCA such that the channel in which the CCA is performed is determined to be clear in the event that an energy level in that channel is below a predefined threshold value and the channel in which the CCA is performed is determined to be occupied in the event that the energy level in the channel is above the predefined threshold value.

36. The device of claim 35, wherein the device is configured to set the predefined threshold value in dependence of the channel width of the channel in which the CCA is performed.

37. The device of claim 35, wherein the device is configured to set the predefined threshold value in dependence of a frequency region in which the CCA is performed is located.

38. The method of claim 13, wherein determining the quality indicator for each of the plurality of channels by multiplying each of a plurality of considered parameters with a predefined weight value to obtain weighted parameters and determining the quality indicator based on the sum of the weighted parameters, wherein the considered parameters comprise one or more of the following parameters:
    link quality;
    cleanliness of the respective channel;
    historic behavior on the channel usage and on the channel bandwidth;
    presence of collocated wireless communication networks;
    required quality of service (QoS) in terms of signal to noise ratio, SNR;
    regulatory limits of an allowed maximum output power and/or maximum Equivalent Isotropically Radiated Power (EIPR) limits;
    regulatory limits of an allowed minimum and/or maximum channel bandwidth in a sub-band, in which the respective channel is located;
    device capability of the device;
    deployment scheme; and
    policy constraints.

39. The device of claim 31, wherein the device is configured to determine the quality indicator for each of the plurality of channels by multiplying each of a plurality of considered parameters with a predefined weight value to obtain weighted parameters and determining the quality indicator based on the sum of the weighted parameters, wherein the considered parameters comprise one or more of the following parameters:
    link quality;
    cleanliness of the respective channel;
    historic behavior on the channel usage and on the channel bandwidth;
    presence of collocated wireless communication networks;
    required quality of service (QoS) in terms of signal to noise ratio, SNR;
    regulatory limits of an allowed maximum output power and/or maximum Equivalent Isotropically Radiated Power (EIPR) limits;
    regulatory limits of an allowed minimum and/or maximum channel bandwidth in a sub-band, in which the respective channel is located;
    device capability of the device;
    deployment scheme; and
    policy constraints.

* * * * *